(12) United States Patent
Wang et al.

(10) Patent No.: US 12,498,974 B2
(45) Date of Patent: Dec. 16, 2025

(54) ADAPTIVE COLLABORATIVE MEMORY WITH THE ASSISTANCE OF PROGRAMMABLE NETWORKING DEVICES

(71) Applicant: Intel Corporation, Santa Clara, CA (US)

(72) Inventors: Ren Wang, Portland, OR (US); Christian Maciocco, Portland, OR (US); Yipeng Wang, Portland, OR (US); Kshitij A. Doshi, Tempe, AZ (US); Vesh Raj Sharma Banjade, Portland, OR (US); Satish C. Jha, Portland, OR (US); S M Iftekharul Alam, Hillsboro, OR (US); Srikathyayani Srikanteswara, Portland, OR (US); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 17/710,594

(22) Filed: Mar. 31, 2022

(65) Prior Publication Data
US 2022/0222118 A1    Jul. 14, 2022

(51) Int. Cl.
*G06F 9/46* (2006.01)
*G06F 9/50* (2006.01)
*G06F 12/1045* (2016.01)
*G06F 13/42* (2006.01)

(52) U.S. Cl.
CPC .......... *G06F 9/5016* (2013.01); *G06F 9/5022* (2013.01); *G06F 12/1063* (2013.01); *G06F 13/4221* (2013.01)

(58) Field of Classification Search
CPC .. G06F 9/5016; G06F 9/5022; G06F 12/1063; G06F 13/4221
See application file for complete search history.

*Primary Examiner* — Gregory A Kessler
(74) *Attorney, Agent, or Firm* — Essential Patents Group, LLP; Christopher K. Gagne

(57) ABSTRACT

Methods, apparatus, and systems for adaptive collaborative memory with the assistance of programmable networking devices. Under one example, the programmable networking device is a switch that is deployed in a system or cluster of servers comprising a plurality of nodes. The switch selects one or more nodes to be remote memory server nodes and allocate one or more portions of memory on those nodes to be used as remote memory for one or more remote memory client nodes. The switch receives memory access request messages originating from remote memory client nodes containing indicia identifying memory to be accessed, determines which remote memory server node is to be used for servicing a given memory access request, and sends a memory access request message containing indicia identifying memory to be accessed to the remote memory server node that is determined. The switch also facilitates return of messages containing remote memory access responses to the client nodes.

25 Claims, 16 Drawing Sheets

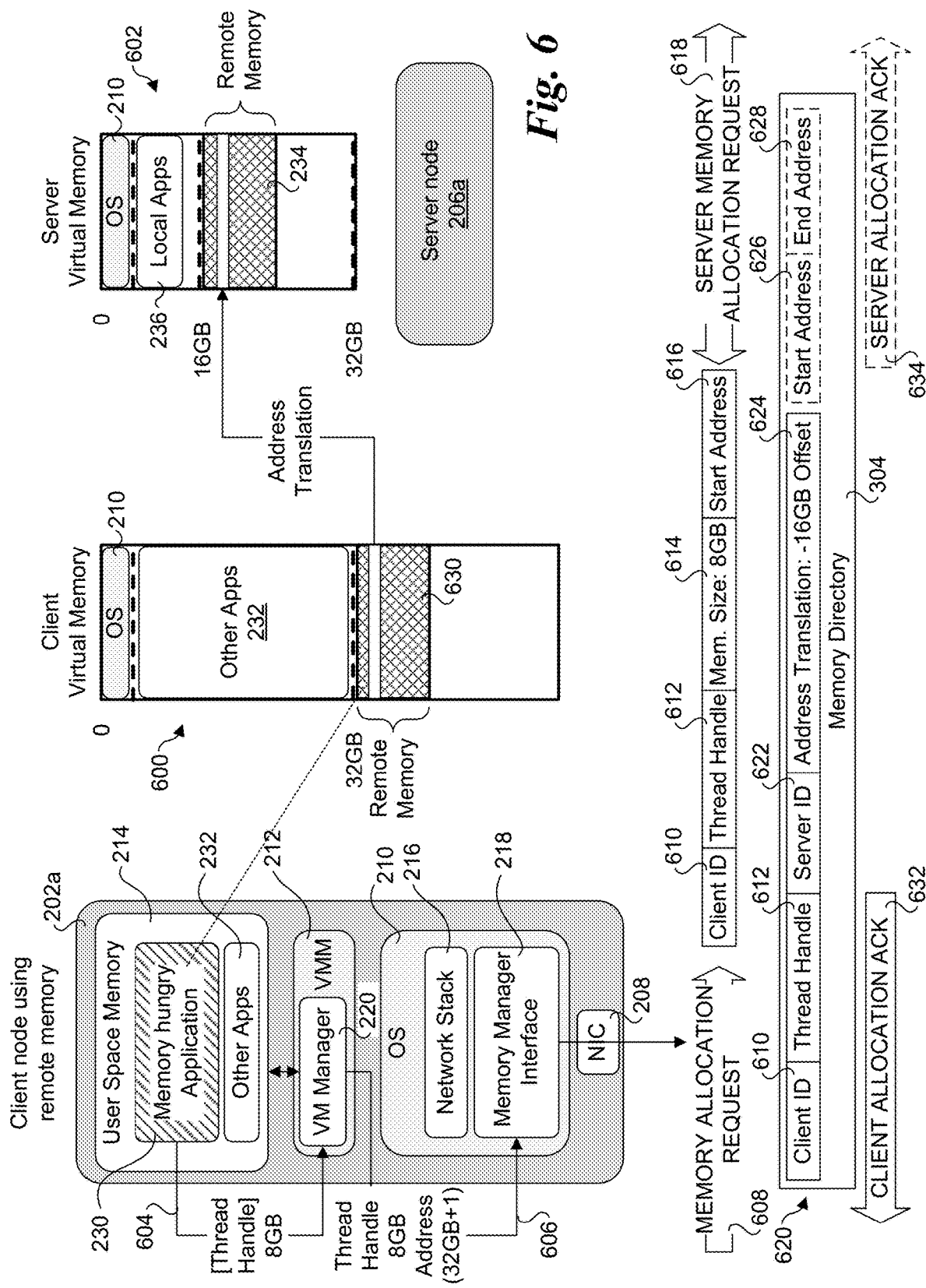

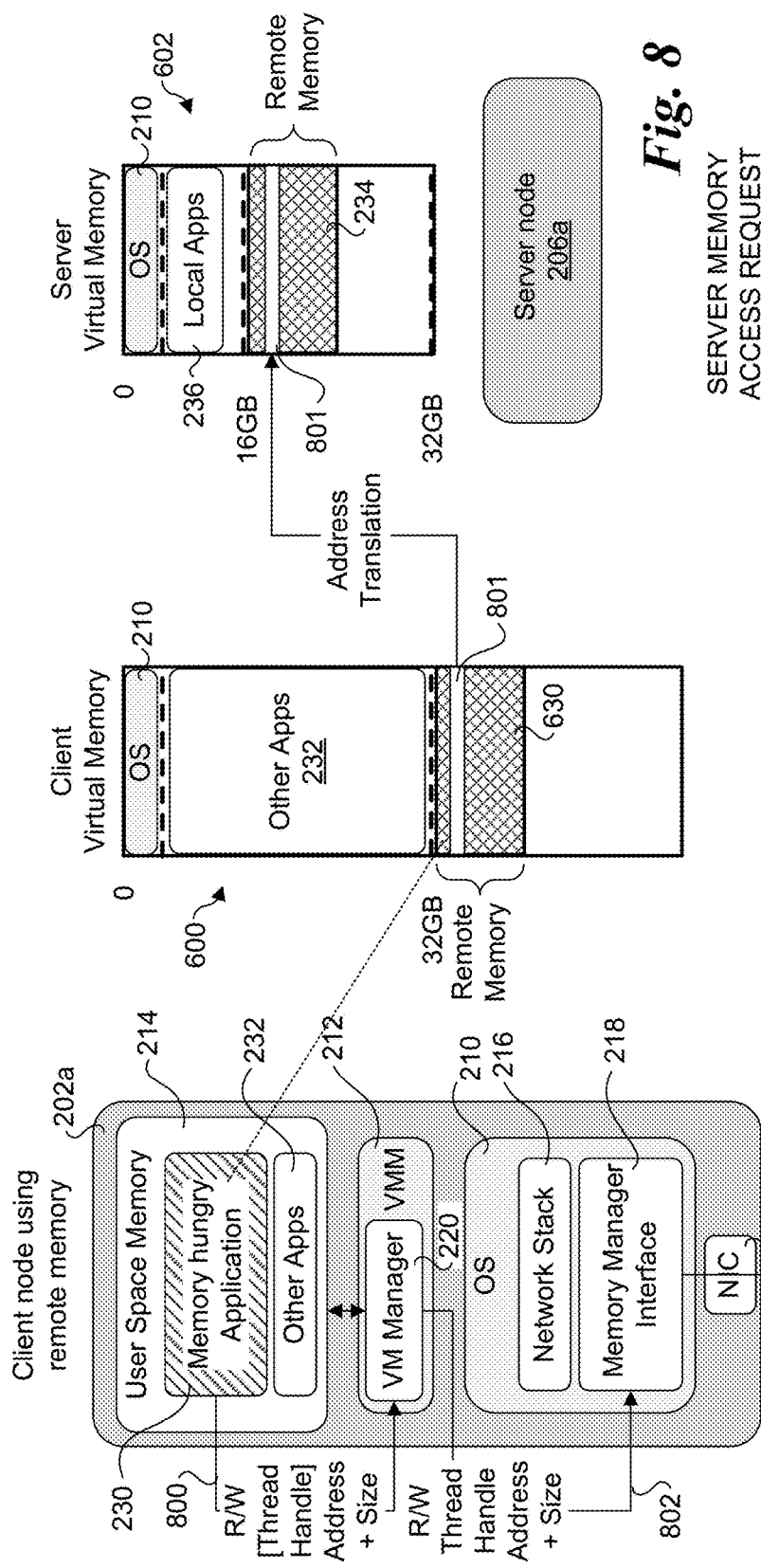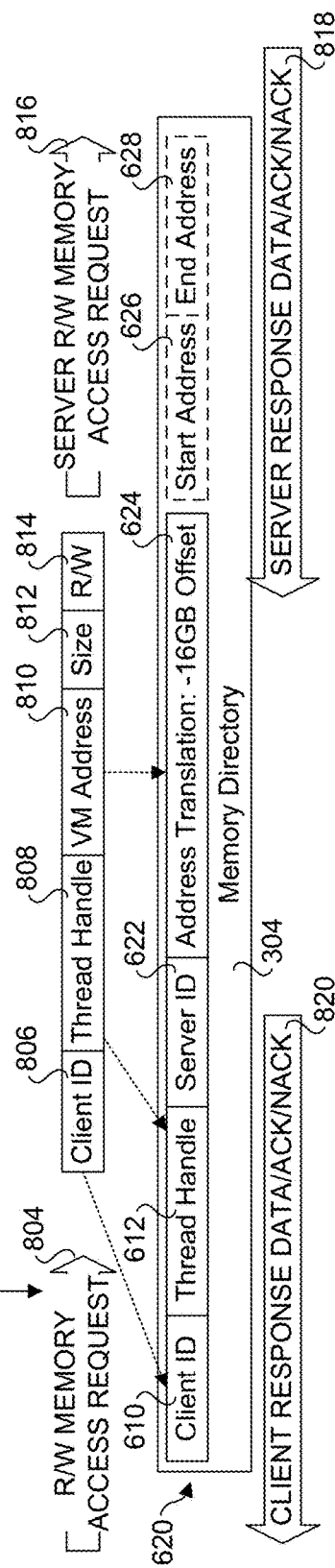
Fig. 8

ADAPTIVE COLLABORATIVE MEMORY WITH THE ASSISTANCE OF PROGRAMMABLE NETWORKING DEVICES

BACKGROUND INFORMATION

Historically, so-called "commodity" servers have been used in data centers and server farms, where the servers comprise off-the-shelf platforms having form factors such as server blades, server modules, 1U, 2U and 4U servers, servers and microservers installed in "sleds" and "trays," etc. Generally, server blades and server modules are installed in chassis or "drawers" that are installed in racks. Likewise, 1U, 2U, and 4U servers and trays are installed in racks. Cabinet installations may also be used. These server platforms generally include compute and local memory and storage resources. For example, a server may include a processor or central processing unit (CPU) coupled to memory (also referred to a local, system or main memory) and a storage device such as a Hard Disk Drive (HDD) or Solid-State Drive (SSD). Under virtualized environment, the compute, memory, and storage resources are shared among multiple virtual machines (VMs) or containers using a hypervisor, virtual machine manager (VMM), virtualization layer or the like.

In some cases, a commodity server's system memory may be insufficient for the memory footprint of the application(s) running on the server's CPU. This leads the operating system's virtual memory manager to resort to swapping memory pages to virtual pages in the local storage devices, which are much slower than system memory and may lead to thrashing issues. One solution for addressing this is to build customized systems with increased memory capacity. However, this is not cost nor energy efficient.

The servers and/or platforms may be deployed in clusters under which the servers/platforms are interconnected in communication via one or more switches, such as Top of Rack (ToR switches). These servers and platforms may also be clustered at the chassis, drawer, sled, tray, or cabinet level, and may be referred to as "nodes" or "compute nodes."

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6 is a diagram schematically illustrating an example of a remote memory allocation according to the flowchart of FIG. 5;

FIG. 8 is a diagram schematically illustrating a message flow for servicing a Read or Write memory access request to remote memory, according to the flowchart of FIG. 7;

DETAILED DESCRIPTION

Figure 1:
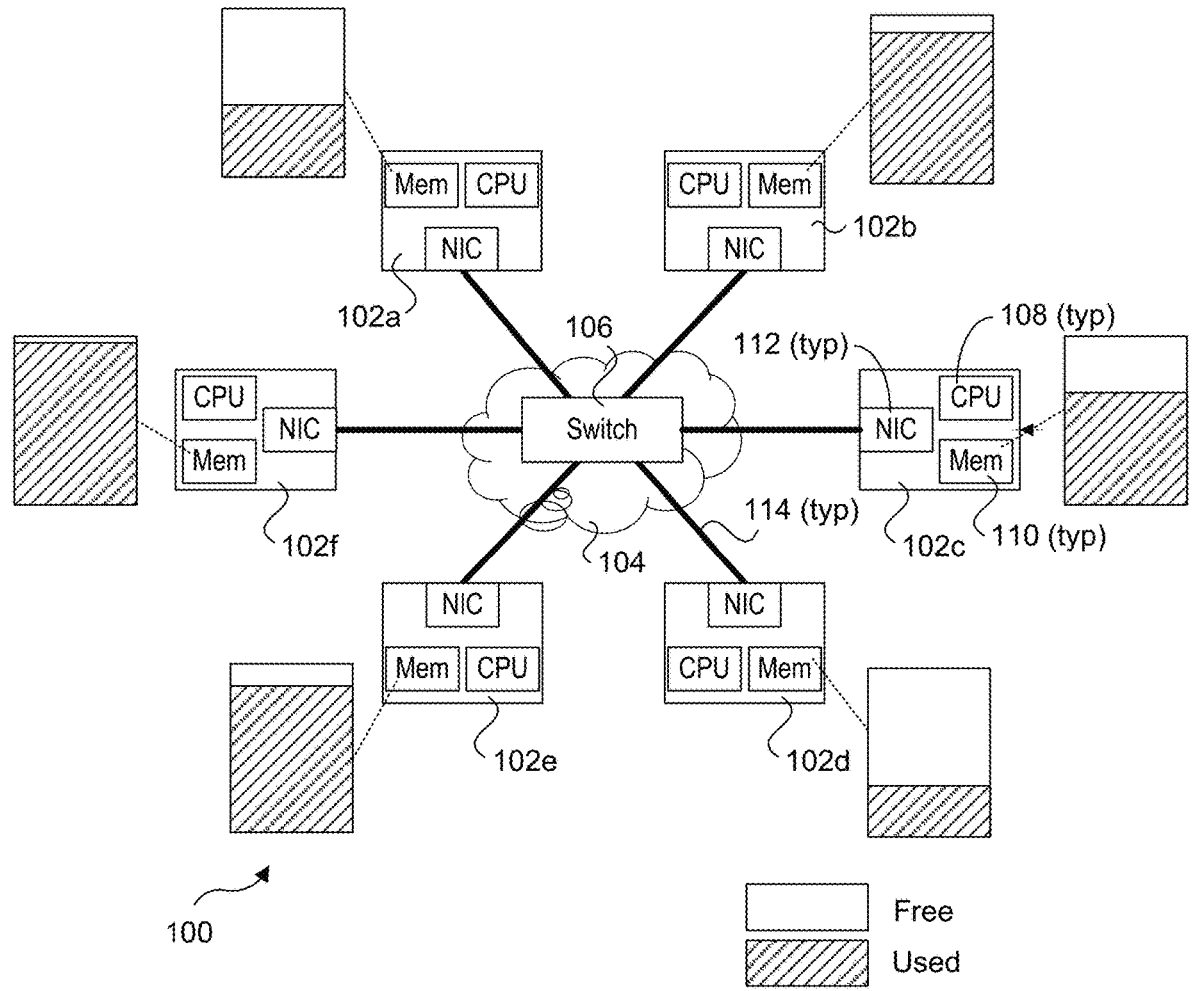
FIG. 1 is a schematic diagram of an exemplary server cluster communicatively coupled via a network or fabric.

Embodiments of methods, apparatus, and systems for adaptive collaborative memory with the assistance of programmable networking devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Many emerging applications such as high-quality video processing, visual data annotation, search and management at the edge, etc., require increasing amount of memory that a single local node often cannot provide, especially with contending applications and potential system memory failures.

The servers and/or platforms in data center "cloud" and "edge" environments may be deployed in clusters under which the servers/platforms are interconnected in communication via one or more switches, such as Top of Rack (ToR switches). These servers and platforms may also be clustered at the chassis, drawer, or cabinet level. Clustered servers/platforms are sometimes referred to as "nodes" or "compute nodes," which are terms used herein.

FIG. 1 shows an example of a small server cluster 100 illustrative of more generalized environments in which aspects of the embodiments disclosed herein may be implemented. Server cluster 100 is illustrative of a conventional network environment under which multiple servers comprising nodes 102a, 102b, 102c, 102d, 102e, and 102f are coupled in communication over a network or fabric 104 including a switch 106. As further shown, each node 102 includes a CPU 108, memory 110, and a Network Interface Controller (NIC) 112 that is coupled to switch 106 via a link 114. Server nodes may also include local storage devices such as SSDs (not shown in FIG. 1).

Generally, network 104 may employ various types of physical links and related protocols, including but not limited to Ethernet, InfiniBand, Compute Express Link (CXL) and Peripheral Control Interconnect Express (PCIe). For networks or fabrics that do not employ Ethernet, NICs 112 would be replaced with an applicable network or Input-Output (10) interfaces, such as InfiniBand Host Control Adaptors (HCAs) for an InfiniBand, CLX interfaces for CLX, PCIe interfaces for PCIe, etc.

Memory usage in a cluster of servers can often be imbalanced depending on changes in the environment and/or workload(s). An example of this is illustrated in FIG. 1 where memory 110 usage levels for nodes 102a, 102b, 102c, 102d, 102e, and 102f are imbalanced. The memory for node 102f is almost completely consumed, and there is only a small amount of available (free) memory for nodes 102b and 102e. Meanwhile, each of nodes 102a 102d are consuming less than half of their available memory, while node 102c is consuming approximately ⅔$^{rd}$ of its available memory.

Instead of over-provisioning local memory which has several disadvantages including cost, energy, etc., taking advantage of distributed remote memory can provide better performance, reliability, and cost effectiveness. Under embodiments disclosed herein, programmable networking devices such as switches, routers, SmartNICs, Infrastructure Processing Units (IPUs), Data Processing Units (DPUs), etc., are implemented as memory control entities that perform memory management tasks to achieve memory collaboration with remote nodes in the cluster. The memory management tasks include: 1) dynamic information telemetry from the server nodes (e.g., memory usage, system reliability, QoS (Quality of Service), and network link quality), 2) decision making on remote memory allocation (which node should donate its local memory and which node receives memory), and 3) maintaining a memory directory ("page table") for nodes to be able to access remote memory assigned to them.

The embodiments provide solutions to multiple existing problems. As explained above, in multi-node clusters applications running on different nodes may exhibit different memory footprints, some over-utilizing their memory capacity while others may under-utilize their memory capacity. Moreover, the dynamic memory usage may change over the time. In addition, system memory may not be reliable all the time. Currently when a component of a system fails, usually the whole system is migrated to another server to provide continuous services. That solution is expensive and disruptive.

Figure 2A:
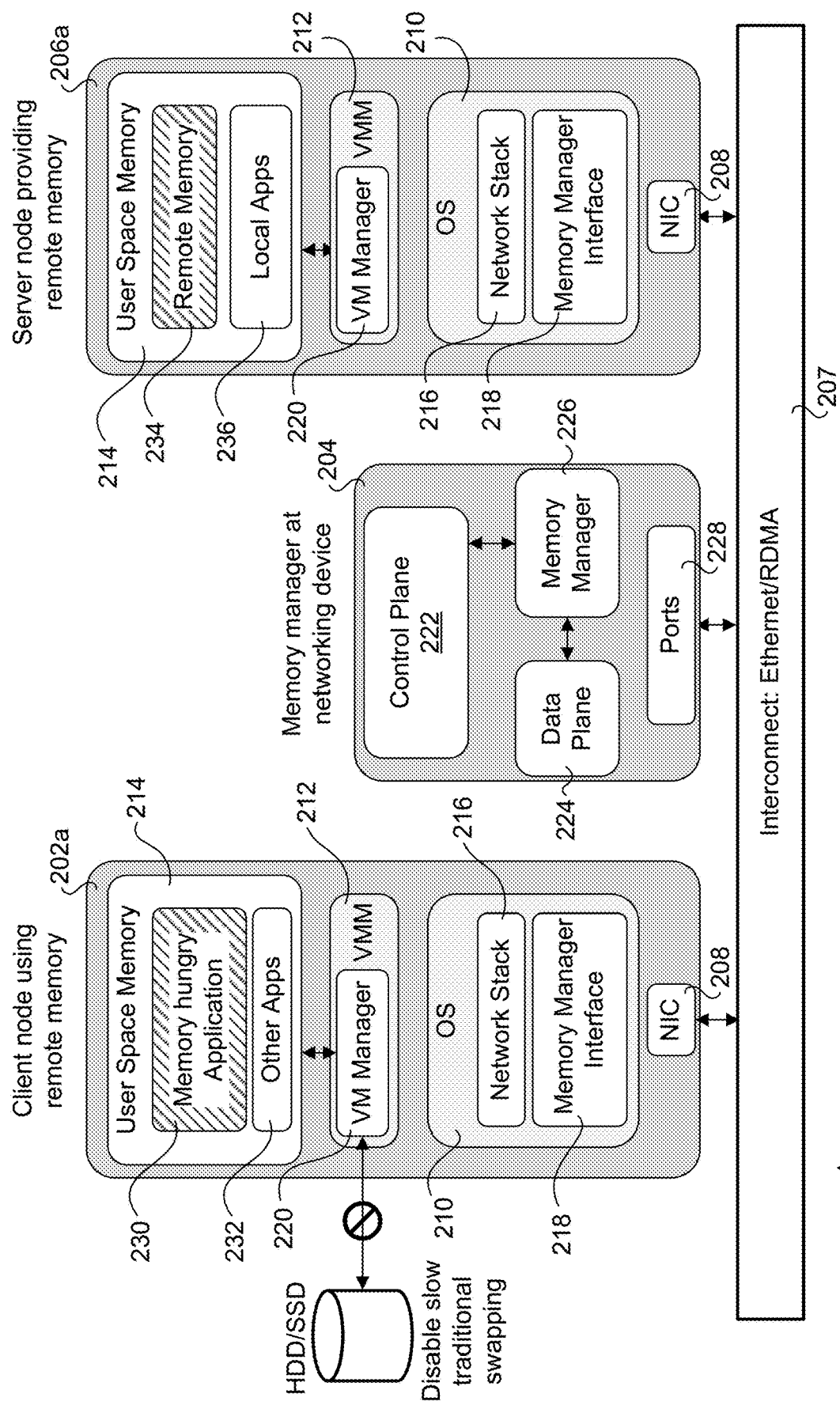
FIG. 2a is a diagram of a system architecture illustrating components employed by remote memory client and server nodes and a programmable networking device that are interconnected via an Ethernet network or fabric, according to one embodiment.
Figure 2B:
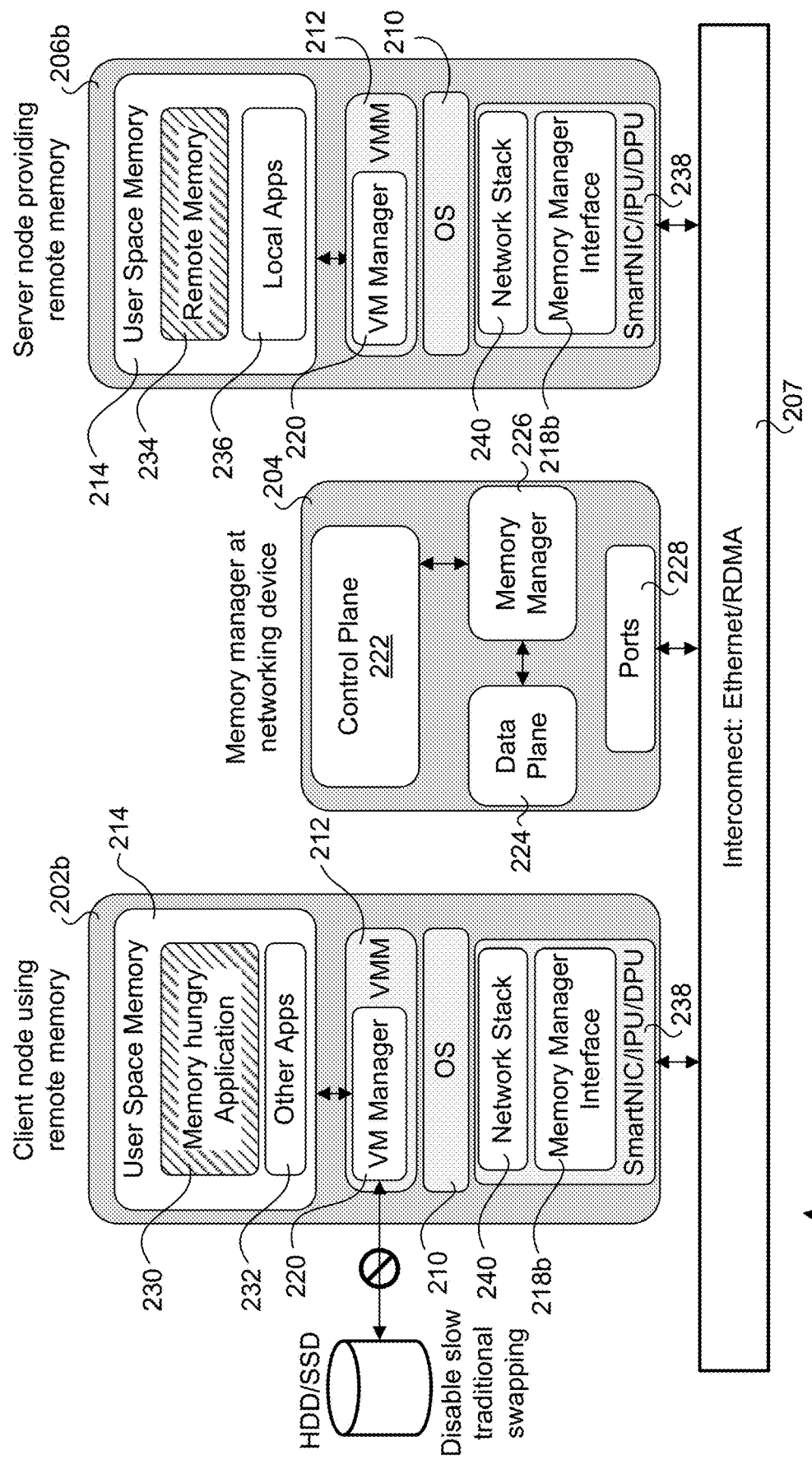
FIG. 2b is a diagram illustrating an alternative configuration for the system architecture of FIG. 2a under which the remote memory client and server nodes include a SmartNIC, IPU, or DPU.
Figure 2C:
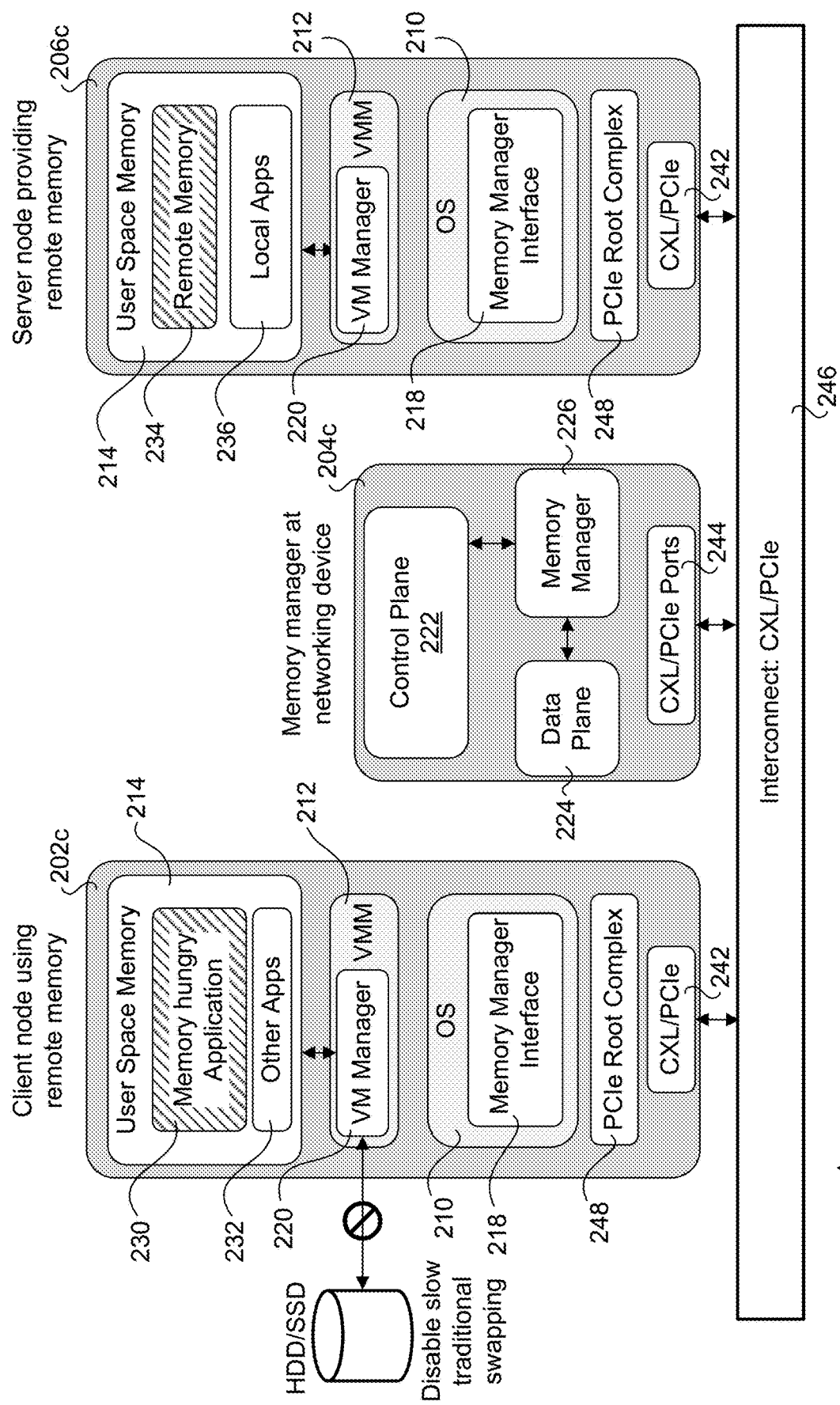
FIG. 2c is a diagram illustrating an alternative configuration for the system architecture of FIG. 2a under which the interconnect comprises CXL or PCIe links.

FIGS. 2a, 2b, and 2c show high-level system architectures according to respective embodiments. The system architecture 200a in FIG. 2a includes a client node 202a, a programmable networking device 204 and a server node 206a coupled in communication via an interconnect 207. Client node 202a and server node 206a are generally representative of servers/nodes in a system architecture or environment under which a given server/node can operate as a client node or a server node. Moreover, an actual deployment might include significantly more servers/node, some of which that might be operated as client nodes, some operated as server nodes, and some not operated as either.

In the illustrative embodiments, client node 202a and server node 206a have similar hardware and software components including a NIC 208, and operating system 210, a Virtual Machine Manager 212, and user space memory 214. OS 210 includes a network stack 216 and a memory manager interface 218. In addition, OS 210 will include various conventional operating system components that are not shown.

VMM 212 is representative of a virtualization component that may include but is not limited to a Type-1 (bare metal) or Type-2 Hypervisor and various virtualization layer architectures used for deploying containers. As used in the art, the terms VMM and Type-2 Hypervisor are interchangeable and refer to Hypervisors that run over an operating system. Each of these types of virtualization components will include a virtual memory (VM) manager 220.

Programmable networking device 204 includes a control plane 222, a data plane 224, a memory manager 226, and ports 228. In one embodiment, programmable networking device 204 is a switch. However, the illustrated components and functionality for network device 204 may be implemented in other types of network devices, as describe in further detail below.

As further shown in FIG. 2a, user space memory 214 on client node 202a is being consumed by a memory hungry application 230 and other applications 232. As discussed above, under a conventional approach once a server's local memory is consumed, the server's virtual memory manager (e.g., VM manager 220 in this example) would begin swapping out pages to an HDD or SDD that is being used as virtual memory). However, under the embodiments herein, servers are enabled to use available memory on other servers in the cluster. This is depicted by a remote memory region 234 in user space memory 214 on server node 206a, which is available memory that is not being consumed by local applications 236. The use of the remote memory is transparent to applications running on the servers/nodes in the system—from the perspective of the applications, the remote memory appears to be local memory that has been allocated for use by the applications.

Figure 3:
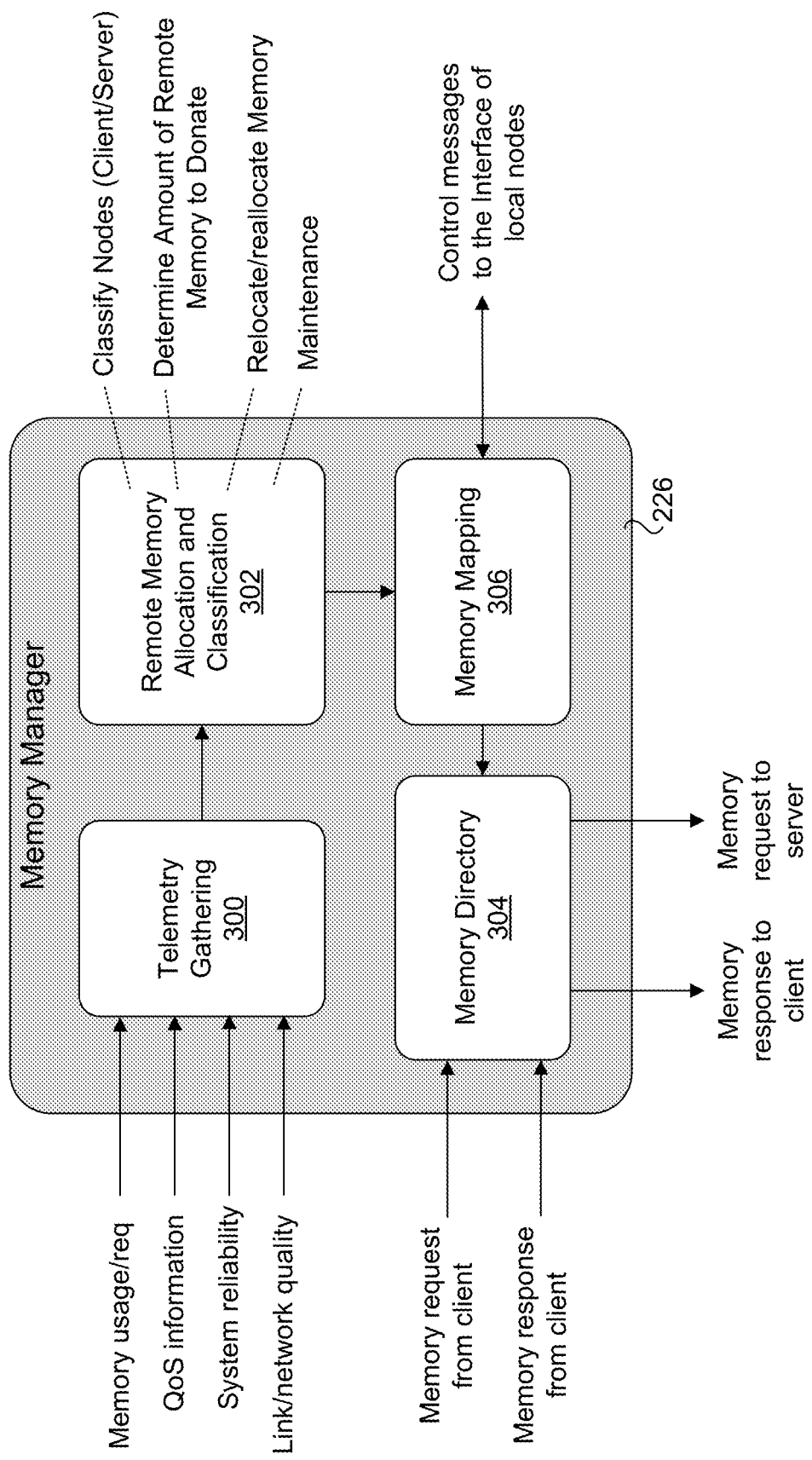
FIG. 3 is a block diagram illustrating modules implemented in a memory manager, according to one embodiment.

When the local memory of a client node is not enough, instead of swapping to local disk (which is slow) VM manager 220 sends memory allocation and access requests (read/write) through memory manager interface 218 to memory manager 226 in programmable networking device 204. Data plane 224 will parse the incoming packets and if it is a memory request, internally forward the request to memory manager 226. Memory manager consists of several functionalities, as shown in FIG. 3 and described below. The memory manager, upon receiving the request, will check its memory directory (similar to a page table), and send the request to a corresponding server. After server node 206a processes the requests, the response(s) will be sent back to programmable networking device 204. Memory manager 226 will process the response and send back to the corresponding client node (client node 202a in this example).

FIG. 2b shows an architecture 200b in which a client node 202b and server node 206b include a SmartNIC, IPU, or DPU 238 in place of NIC 208. SmartNICs, IPUs and DPUs include one or more means for programming functionality beyond what is generally supported by a NIC. This includes a CPU or other processing component and (generally) and Field Programmable Gate Array (FPGA) or other programmable logic. In some cases, the logic may be preprogrammed using an Application Specific Integrated Circuit (ASIC) or the like. As described and illustrated below by an example of an IPU card in FIG. 10 and a SmartNIC card in FIG. 11, SmartNICs, IPUs and DPUs also include on-board memory and are enabled to implement functionality via execution of instructions of a CPU or other processing component and/or implement logic for effecting functionality by programming the FPGA, by means of pre-programmed logic, or any the combination of the foregoing.

As shown in FIG. 2b, a memory manager interface 218b supporting additional optional functionality (beyond memory manager interface 218) is implemented by SmartNIC/IPU/DPU 238, as is a network stack 240. Generally, an SmartNIC/IPU/DPU may include or be programmed to perform packet processing operations, including Layer 3 and Layer 4 operations, as well as perform packet inspection, packet classification, etc.

FIG. 2c shows an architecture 200c in which a client node 202c and server node 206c include a CXL or PCIe interface 242 in place of NIC 208, while programmable networking device 204c is a CXL or PCIe switch including CXL/PCIe ports 244. Each of client node 202b, server node 206b, and programmable networking device 204c are connected to an interconnect 246 comprising a CXL or PCIe fabric employing CXL or PCIe links (noting CXL links are also referred to as CXL flex buses). Client node 202c and server node 206c further include a PCIe root complex 248 that is implemented in these server's CPU.

CXL and PCIe employ packetized data transfers using transactions. CXL is built on the PCIe physical and electrical interface and includes PCIe-based block input/output protocol (CXL.io) and new cache-coherent protocols for accessing system memory (CXL.cache) and device memory (CXL.mem). In combination with applicable drivers, CXL/PCIe interfaces 242 are enabled to packetize and depacketize data that is transported over interconnect 246 using these protocols to facilitate CXL/PCIe transactions. Likewise, CXL/PCIe ports 244 on programmable networking device 204c in combination with other embedded logic (not separately shown) is able to packetize and depacketize data to facilitate CXL/PCIe transactions.

Generally, the use of the term "packets" herein will apply to the protocol or protocols that are employed by the interconnect being used. For example, for an Ethernet interconnect, the packets will comprise Ethernet packets, while for a CXL or PCIe interconnect the packets will comprise CXL or PCIe packets. Also, the use of the term "messages" herein applies to communications under which the messages will be transferred using one or more packets, as known in the art.

FIG. 3 shows the block diagram of memory manager 226 and its functionalities. The modules include a telemetry gathering module 300, a remote memory allocation and classification module 302, a memory directory module 304, and a memory mapping module 306. When programmable networking device 204 is a switch, packets flowing through the data plane (224) of the switch are parsed, and memory request related packets are identified and sent to memory manager 226 for further processing.

Telemetry gathering module 300 is responsible for monitoring the node and link status. In one embodiment this includes monitoring dynamic memory usage and requirements. This refers to how much memory the application is using now and how much it will require soon. The information can be provided by applications or monitored and predicted by an on-node telemetry module. There are various known techniques for how to gather on-board information of these type using platform telemetry.

Telemetry gathering module 300 also gather QoS and system reliability information and monitor link quality. The application's QoS information (and optionally, explicit/implicit resiliency requirement) will be used to determine remote memory allocation when all of a (remote memory) request cannot be satisfied. The system reliability information can be provided by the on-board monitoring system, or the telemetry gathering module can monitor the latency distribution to estimate the corresponding system reliability. In one embodiment, a client with low reliability will be given high priority when requesting memory. On the other hand, a server with low reliability will be given lower priority when donating memory. Link quality can be monitored via switch communication with nodes, such as by monitoring port traffic and/or monitoring ingress and egress queues. Generally, link quality can be impacted by the level of congestion in the cluster and physical link connection bandwidth or signal quality. Generally, telemetry gathering module 300 gathers these data in a continuous manner, such as via periodic sampling, for example.

The foregoing information gathered by telemetry gathering module 300 is fed into remote memory allocation and classification module 302. This module classifies nodes into client nodes (requesting extra remote memory) and server nodes (donating extra local memory for other nodes to use). In one embodiment, the decision-making policy for classifying the nodes performed periodically to accommodate changing situations (such as change in workload on the various nodes). For example, a client at time T1 could become a server at time T2, and vice versa.

Remote memory allocation and classification module 302 also determines how much memory each server can donate. In one embodiment, based on the holistic view of memory usages from all the nodes, this module decides the amount of memory each server node should donate, with the goal being to satisfy the requests from clients as much as possible with QoS and reliability considerations. Again, such decisions should be dynamic since application behaviors may change. In this operation, each client memory request is inspected against an available server memory pool, if all requests can be accommodated, server and client find a match that feed into memory mapping module 306. If the server memory pool is not large enough, the client requests with higher QoS level or lower reliability indication are satisfied first.

Remote memory allocation and classification module 302 may also make a decision to relocate already allocated memory from one server node to another either for optimization, or operational management (such as upgrade or removal from the service) purposes. Such relocation may be performed by specialized logic in the programmable switch (such as client-level memory load/store transactions) itself or requested from either current or new target server node. In addition, this module may remove some server nodes or particular memory regions on such server nodes from new memory allocation requests in case of scheduled operational maintenance planned for these server nodes.

After deciding which nodes should be servers and the amount of memory they should donate to which clients, memory mapping module 306 communicates with each node's memory interface to figure out the borrowed memory range. In one embodiment, this mapping can be performed either based on remote load/store semantics or remote memory swapping semantics.

Figure 4:
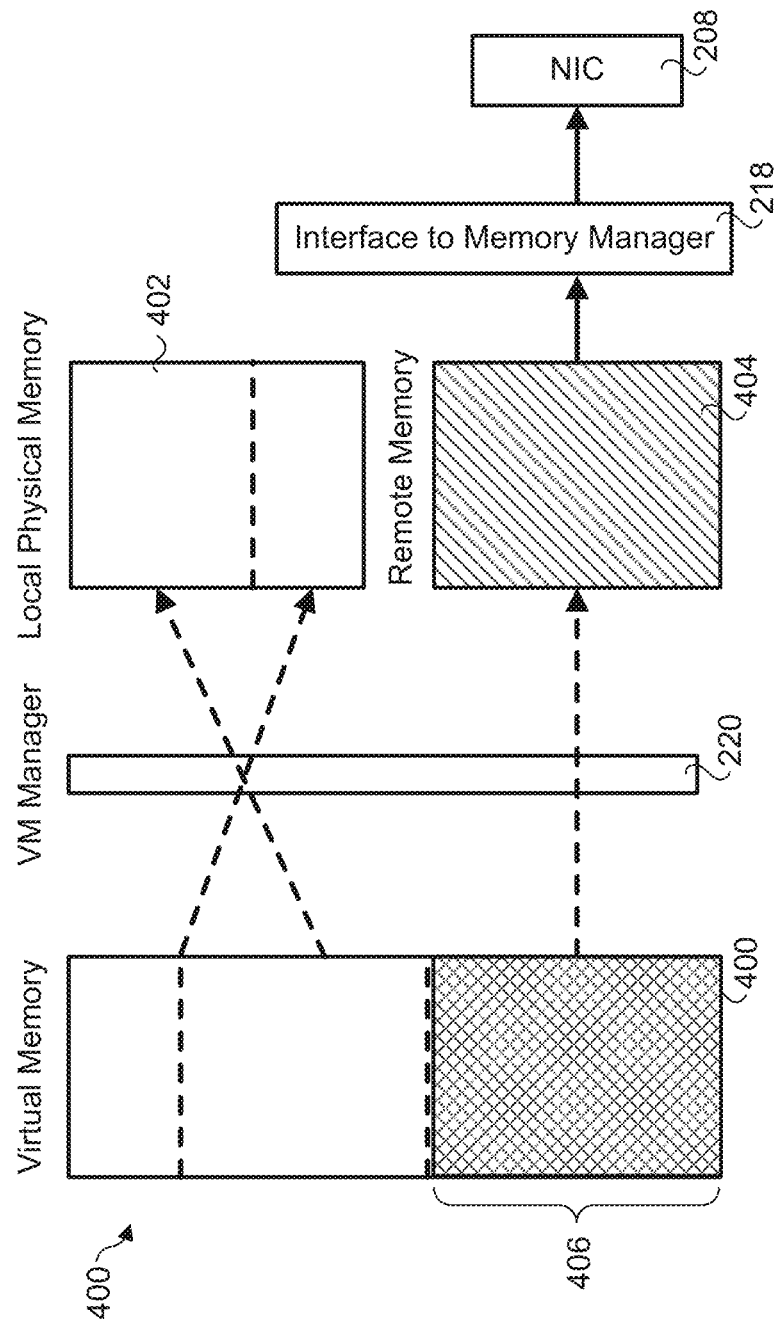
FIG. 4 is a diagram illustrating an example of remote load/store semantics.

An example of remote load/store semantics is shown in FIG. 4, which depicts virtual memory 400, a VM manager 220, local physical memory 402, a remote memory range 404, memory manager interface 218 and a NIC 208. When using remote load/store semantics, remote memory rang 404*e* will be mapped via the local node's memory manager interface 218 to a certain virtual memory range 406 in virtual memory 400. When the client accesses this memory range, the requests will be routed through an applicable networking interface (e.g., NIC 208) to the memory manager and then to the memory server.

Using remote memory as a swapping device is well-studied. What is novel under the embodiments disclosed herein is that the client only needs to logically map a block disk device without having to know which specific server it connects to (to access the block disk device). The memory manager in the switch/IPU takes care of this mapping, creating and abstraction layer between what it exposes to the client and where the remote memory physical resides (e.g., what server node). The memory manager checks its directory and sends the requests to the corresponding server. It does not have to physically configure a block disk device Remote memory swapping is relatively easy to implement by mapping remote memory as a block device. Load/store semantics is somewhat more difficult to implement due to tight latency requirements. However, recent research using CXL as applied to networked system has demonstrated such systems provide relatively low latency.

To reduce the complexity of coherency maintenance (when such coherency is required), in one exemplary implementation a certain memory region on the server can be mapped to a single client at any given point in time.

Memory Directory at the Programmable Switch

Memory directory module 304 is used to build and maintain a memory directory that maps the location (e.g., server node) for remote memory that has been allocated for remote memory use. Having a centralized directory at the switch is very efficient and can be replicated to other switches (in embodiments employing redundant switches) very efficiently to provide resiliency against switch failure. Alternatively, as mentioned above in some deployments it may be beneficial to implement the described memory manager functionality on programmable SmartNICs/IPUs/DPUs for scalability, higher flexibility or other reasons.

Memory directory module 304 is the run-time module used to process memory requests and response messages. Depending on the protocol defined with the nodes, the directory receives memory requests for a client, checks the corresponding entry and then decides which server and the memory address it should send the request to. Memory directory module 304 will then assemble the request targeting the corresponding server, and relay the request to the server's remote memory manager interface.

Correspondingly, when memory directory module 304 receives a memory response from a server (after the server processes the memory request), it will parse the message, checking its state table and figuring out which client it should return this response to, and assembles a memory response accordingly, which is sent to the requesting client via the applicable interconnect (network link, fabric link, CXL link, PCIe link, etc.).

In a multi-tenant environment, memory directory module 304 may maintain a similar directory per-tenant, especially if there is a concern of unintended data-plane activity through which one tenant or application tries to learn about memory accessing pattern of other entities and later leverages such information in malicious way. To avoid such problem, the SRAM or registers of the switch can be logically divided into multiple blocks through control-plane configuration, where each block can host tenant-specific memory directory. The packet containing memory access request coming from a particular tenant will be hashed into the appropriate block to read the memory map information.

In a secured environments, to enable fully encrypted messages to be passed across the network, the programmable switch may cooperate with SmartNICs/IPUs/DPUs in client and server nodes by assigning virtual memory region IDs or virtual memory addresses and securely distributing them to these nodes to be used in later memory transactions, so the NICs in these nodes may become the security endpoints exposing only virtual memory instead of exact memory addresses. Of course, this is only one possible protocol implementation, while the particular protocol and fields used between NICs and switches can be different. For example, SmartNICs/IPUs/DPUs may implement homomorphic encryption/decryption endpoints allowing switches to perform some functionality, such as memory mapping, queries on the encrypted packets, without the need to compromise data-in-motion security.

Node's Memory Manager Interface

Memory manager interfaces 218 and 218*b* are interfaces that communicate with memory manager 226 in programmable networking devices 204 and 204*c*. This interface handles both control plane messages (e.g., usage, system reliability, QoS etc.) and run-time memory request/response messages. A specific header field in the packet is designated to indicate the memory management related packets so the switch's data plane can identify accordingly. In one example implementation, the ToS (type of service) field in an IP header can be leveraged to differentiate memory management related packets from the other application packets. For CXL/PCIe packets an optional field in the TLP (Transport Layer Protocol) header may be used.

The node's memory manager interface can be implemented in several ways. For example, the interface can support page swapping and/or extended memory address via load/store semantics. Generally, various means may be employed for implementing memory manager interface functionality, including in software via execution of instructions on a processing element (e.g., CPU core, embedded processor), and/or using embedded logic (e.g., an FPGA, ASIC, etc.). As illustrated, in some embodiments the memory manager interface will be implemented in the operating system, while in other embodiments the memory manager interface is implemented in hardware (e.g., in a SmartNIC, IPU, or DPU). Moreover, when the memory manager interface is deployed on a SmartNIC/IPU/DPU, a portion of or full memory manager interface may run either on the CPU of the node (as shown in FIG. 2c) or be co-located with the memory manager running on the SmartNIC/IPU/DPU.

In addition to the interconnects shown herein (Ethernet, CXL, PCIe), other types of existing or future interconnects may be used in a similar manner. In addition, both wired cables, optical fiber or wireless links may be used.

Remote Memory Allocation

Figure 5:
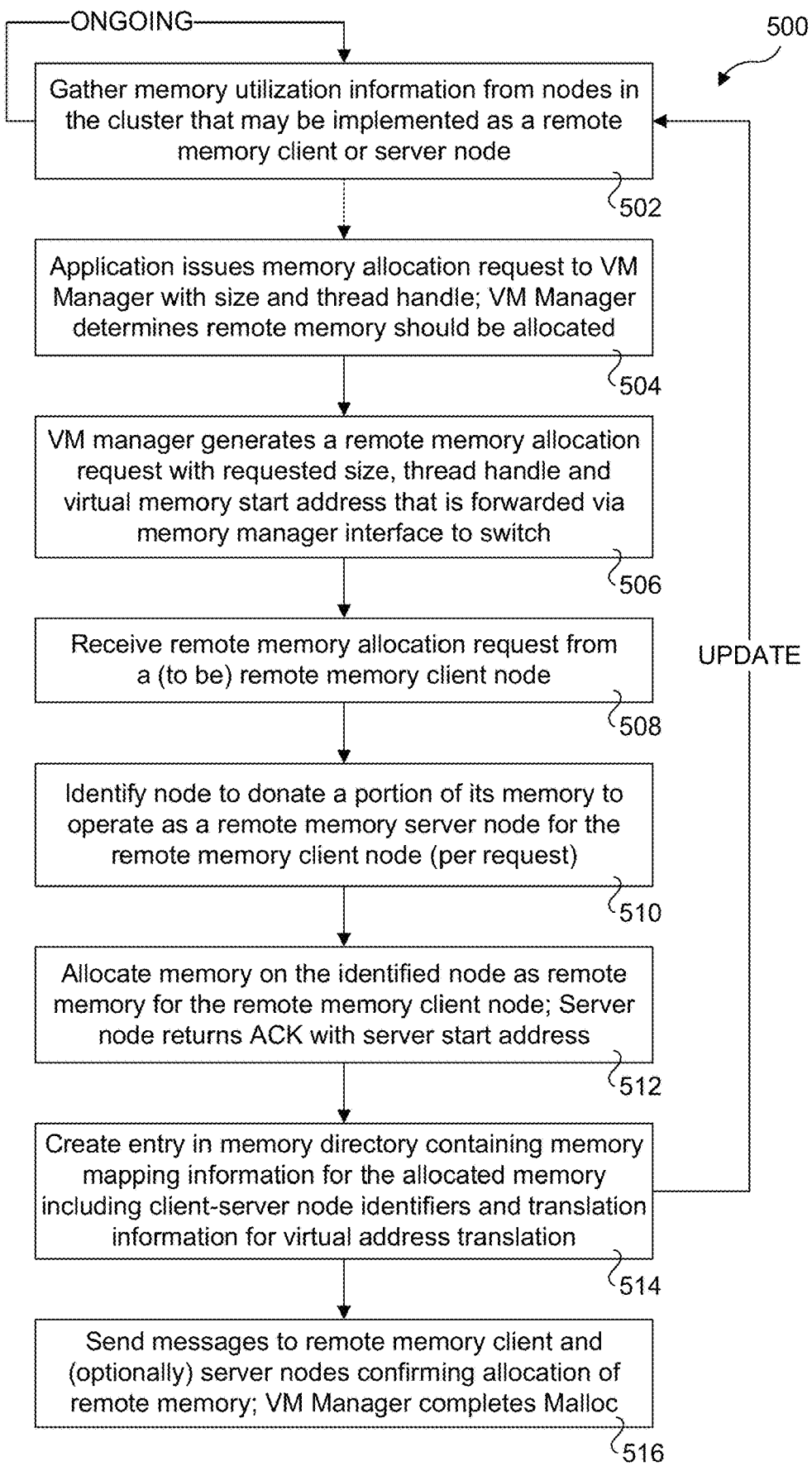
FIG. 5 is a flowchart illustrating operations performed to effect a remote memory allocation, according to one embodiment.

FIG. 5 shows a flowchart 500 illustrating operations performed to realize a remote memory allocation, while FIG. 6 schematically illustrates an example of a remote memory allocation. In a block 502, memory utilization information is gathered from nodes in the cluster that may be implemented as a remote memory client or remote memory server. For example, this operation is performed be telemetry gathering module 300. As shown by the loop back to itself, the operation of block 602 is performed on a continuous and/or ongoing basis. In one embodiment the memory utilization information is gathered by periodically by polling a telemetry interface on the nodes. Optionally, the nodes may be configured to periodically push their memory utilization information to the switch (e.g., via built-in telemetry support on the nodes).

As shown in FIG. 6, each of (remote memory) client node 202a and (remote memory) server node 206a have 32 GB of physical memory. As depicted by a client virtual memory map 600, the 32 GB of physical memory on the client node is substantially consumed by the OS 210 and the other applications 232. Meanwhile, as shown by a server virtual memory map 602 for server node 206a, OS 210 and local applications 236 are consuming less than 16 GB of memory.

Operations for implementing the remote memory allocation are shown in blocks 504, 506, 508, 510, 512, 514, and 516. With reference to block 504 and FIG. 6 an application running on client node 202a (depicted as memory hungry application 230) submits a memory allocation request 604 for 8 GB of memory to VM manager 220. As discussed above, the use of remote memory is transparent to applications running on the server nodes and, according, this employs a conventional memory allocation request such as Malloc (memory allocation) for C or C++ source code. The memory allocation request may include an explicit thread handle (such as a memory pointer) or the thread handle may be implicit. In response to receiving the request, VM manager 220 checks client virtual memory map 600 to determine if there is sufficient available virtual memory. In this example, there is insufficient available virtual memory, so VM manager 220 makes a determination to request allocation of remote memory to service memory allocation request 604.

In connection with making this determination, in a block 506 VM manager generates a remote memory allocation request 606 with the requested size, thread handle and a virtual memory start address (of the remote memory to be allocated) is received by memory manager interface 218 which creates a remote memory allocation request message 608 that is forwarded to programmable networking device 204 (e.g., a switch) (see FIG. 2a, not shown in FIG. 6). In this example the virtual memory start address is 32 GB+1. As shown, the remote memory allocation request message includes a client ID 610 that is used to identify the requesting (to be) client node, a thread handle 612, a memory size 614, which in this example is 8 GB, and a virtual memory start address 616. The message will also include other information in its header, such as source address and destination address. In one embodiment the message includes a flag or other indicia that identifies it relates to remote memory. Optionally, or in addition, a NIC or SmartNIC/IPU/DPU may include multiple ports and the memory manager interface may exclusively use one of the ports such that when the switch inspects the source address (corresponding to that port) the switch will know the message is related to remote memory.

In a block 508 the memory manager (on the switch) receives remote memory allocation request message 608. It inspects the switch and determines it is a remote memory allocation request (or otherwise a message relating to remote memory) via the flag or other indicia or via the source address. The switch recognizes the (to be) client node has requested 8 GB of remote memory based on client ID 612 and memory size 614. Accordingly, in a block 510 the switch identifies a node to donate a portion of its memory to operate as a remote memory server node for the remote memory client node. (In this example it is presumed that a remote memory client node-server node association between the two nodes hasn't been set up, noting that there might be remote memory associations between the same client node and server node that are created using separate remote memory allocation requests.) To identify what node will operate at the remote memory server node, the switch looks up the current memory utilization information maintained by the memory manager (e.g., maintained by telemetry gathering module 300 or remote memory allocation and classification module 302.

In a block 512, the memory manager allocates memory on the node that is identified as remote memory that will be made available to the remote memory client node. In this example the identified node is server node 206a, which will receive a server memory allocation request message 618 that will be handled by the memory manager interface 218 on that node. Generally, allocation of the remote memory may employ a message exchange of two or more messages, with the server node returning an ACKnowledgement (ACK) message if it is willing to donate sufficient memory to meet the allocation request size along with a virtual memory start address of the remote memory region using the server's virtual memory map 602.

There are a few ways in which the allocation may be implemented. In one embodiment, the VM manager 220 is an active participant in the remote memory allocation. In this instance, memory manager interface 218 will parse message 618, extract relevant memory allocation request data and forward those data to VM manager 220. VM manager 220 will then determine (or not) adequate memory is available and will configure remote memory information to be used for handling subsequent memory access requests from client node 202a. VM manager 220 will allocate remote memory region 234 and return the start address for the remote memory region (in the example the start address is 16 GB+1).

Under a second approach, the VM manager 220 is agnostic to remote memory access requests. In this embodiment the memory manager interface on the server node issues a memory allocation request (e.g., Malloc) to the VM manager feigning it is one of the applications running in user space 214; from the perspective of the VM manager, the memory manager interface is just another application among local apps 236. In this case, VM manager would return the virtual memory of the start address of remote memory region 234, which in turn would be returned via an ACK message to the switch.

Upon receipt of the ACK message (if allocation is successful), the switch creates an entry 620 in memory directory 304 including client ID 610, thread handle 612, a server (node) ID 622 and an address translation 624. The address translation is used to translate virtual memory addresses between the client node and the server node. As shown and discussed above, the virtual memory start address for the client node 202a is 32 GB+1 while the virtual memory start address in server virtual memory map 602 is 16 GB+1. Thus, the address translation is −16 GB.

In some embodiments, entry 620 further includes a virtual memory start address 626 and end address 628 defining the start and end addresses of remote memory region 630 in client virtual memory map 600. As describe below, these virtual memory start and end addresses are used by memory directory 304 to verify a remote memory access request from a client node is a valid request that is within one of its allocated remote memory regions.

The remote memory allocation process is completed in block 516 in which the memory manager sends a client ACK message 632 and an optional server ACK message 634 confirming successful allocation of the remote memory. Upon receipt of client ACK message 632, memory manager interface 218 on client node 202a parses the message to extract the confirmation and forwarded the configuration to VM manager 220. VM manager 220 then completes the memory allocation request by returning a Malloc response to the memory hungry application 230. Again, from the perspective of applications running on the nodes in the cluster, remote memory appears to be local memory. Thus, the returned Malloc just indicates that the memory allocation request succeeded. At the point, memory hungry application 230 is able to use memory in remote memory region 630.

Figure 7:
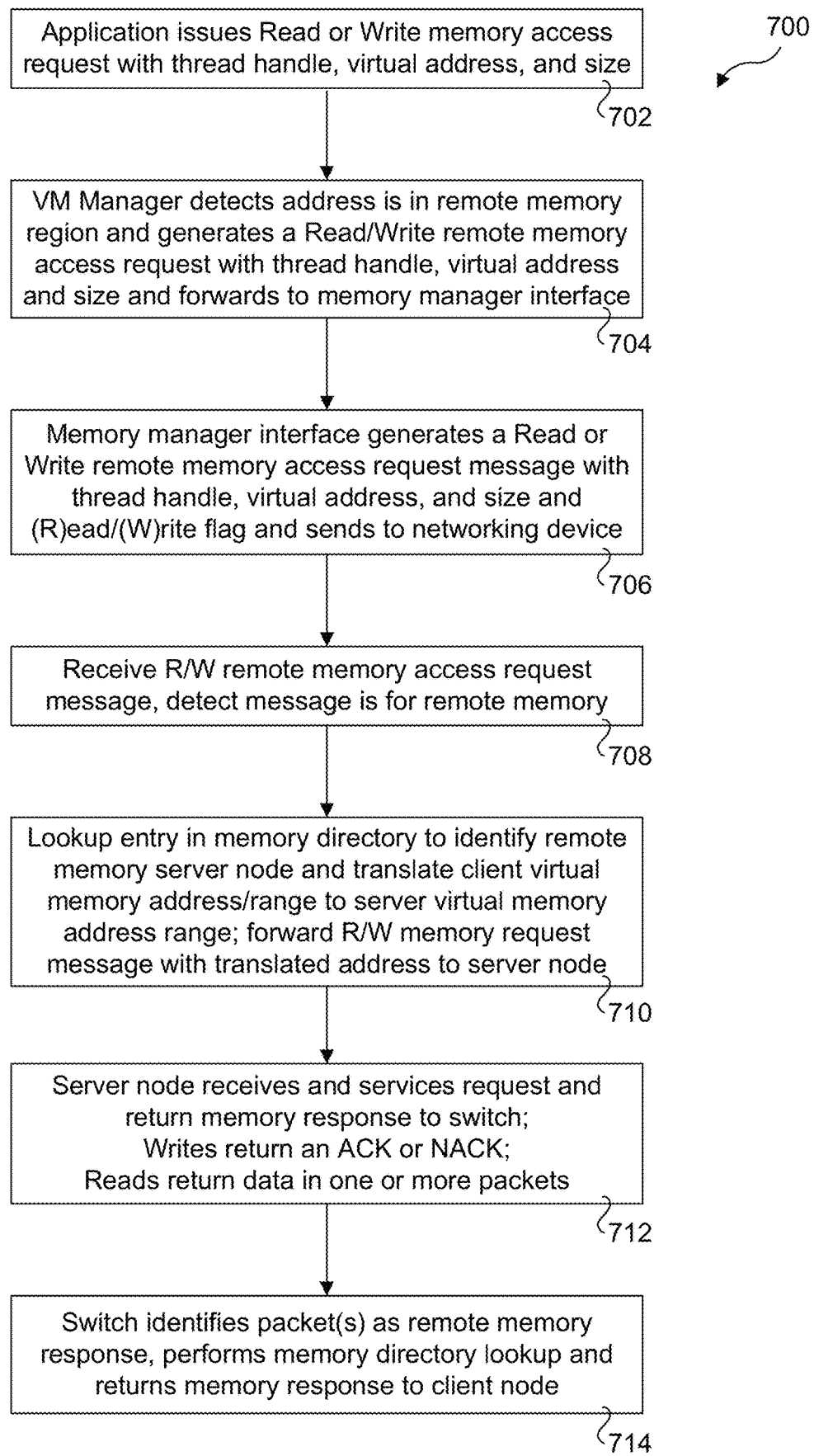
FIG. 7 is a flowchart illustrating operations performed to service client node application Read and Write memory access requests to remote memory, according to one embodiment.

Operations performed to service client node application Read and Write memory access request to remote memory are shown in a flowchart 700 in FIG. 7 and schematically illustrated in FIG. 8. The process begins in a block 702 in which an application issues a Read or Write memory access request with thread handle, virtual memory address, and size. This is a conventional Read/Write memory access request at this point, as from the application's viewpoint the request is for accessing local memory. The request is forwarded (internally) to VM manager 220, which handles application requests to access memory in virtual memory map 600, as shown in FIG. 8 by a R/W memory access request 800. This memory access request corresponds to access a portion of memory 801 in remote memory region 630 (on client node 202a and remote memory region 234 on server node 206a.

In a block 704 VM manager 220 detects the virtual address is within remote memory region 630 and generates a Read/Write remote memory access request 802 with thread handle, virtual address and size and forwards the request to memory manager interface 218 on client node 202a. In a block 706, in response to the request the memory manager interface generates a Read or Write memory access request message 804 and sends it to programmable networking device 204 to be handled by memory manager 226. As shown in FIG. 8, Read or Write memory access request message 804 includes a client ID 806, a thread handle 808, a virtual memory address 810, a size 812, and a R(ead)/(W)rite flag 814.

In a block 708 the programmable networking device receives Read or Write memory access request message 804 and detects that it is a message relating to a remote memory access request. Message 804 is internally forwarded to memory directory module 304, which performs a lookup of its remote memory allocation entries in a block 710 to identify a match based on the client ID and thread handle, which in one embodiment are used to uniquely identify the remote memory allocation entries generated and maintained by memory directory module 304. As illustrated, the matching entry is entry 620 corresponding to the remote memory allocation example of FIG. 6 above. The memory manager then applies address translation 624 to the virtual memory address Read or Write memory access request message 804 to obtain the virtual address for the start of the requested portion of memory 801 in remote memory region 234 in server virtual memory map 602 and forwards a server R/W remote memory access request message 816 with the translated virtual memory address to server node 206a.

In a block 712 the server node receives the R/W remote memory access request message and services the request to return an applicable memory response to the programmable networking device. Upon receiving the message, the memory manager interface 218 on server node 206a parses the message and forwards an associated memory request to VM manager 220 on the server node. For a Read request, the VM manager will read an applicable portion of remote memory region 234 (memory portion 801 in this example) and return the read data to the memory manager interface, which will generate one or more server response messages 818 and return those to the programmable networking device. For a Write remote memory access, the data contained in the request will be written to an applicable portion or remote memory region 234, beginning at the translated virtual memory address. If successful, an ACK will be returned with server response messages 818. If not successful, a Negation ACK (NACK) will be returned with server response messages 818.

The process is completed in a block 714 in which the programmable networking device (e.g., switch) identifies the one or more packets as a remote memory response, performs a memory directory lookup to obtain the client ID identifying the client node the response is to be returned to and returns a client response message 820 comprising one or more packets of data or an ACK or NACK, as applicable, to the client node with the client ID.

Remote Memory Block Storage

Figure 5A:
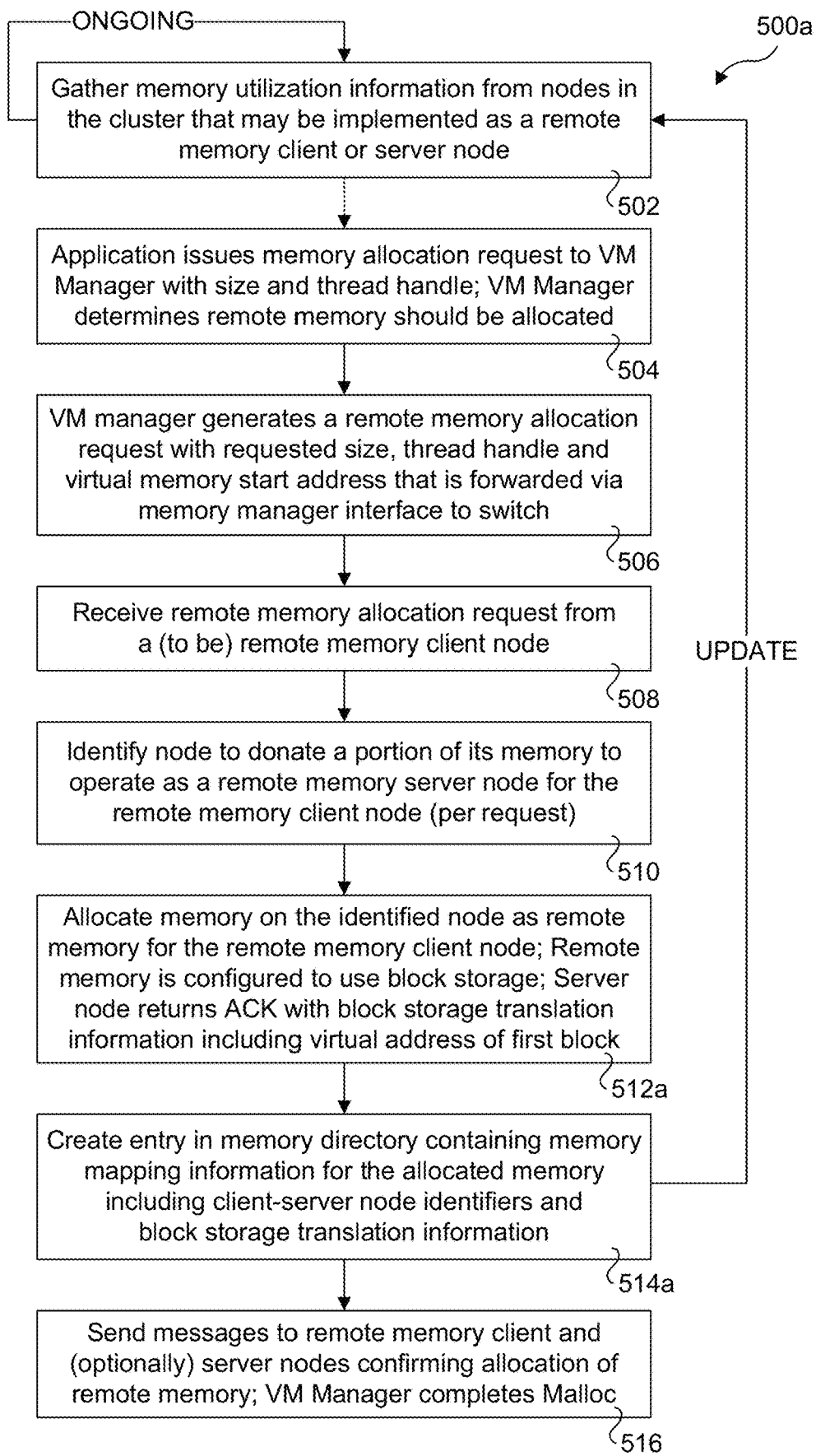
FIG. 5a is a flowchart illustrating operations performed to effect a remote memory allocation in which remote memory is implemented as a virtual block device, according to one embodiment.

As mentioned above, as an alternative to conventional virtual memory address schemes, in some embodiments remote memory is configured as accessed as a virtual block device. Under one embodiment, translation between virtual memory addresses and a corresponding block address in the virtual block storage scheme is handled by logic in the switch (e.g., logic in the memory directory). As depicted in flowchart 500a in FIG. 5a the operations for allocating remote memory using the conventional virtual memory address scheme shown in flowchart 500 in FIG. 5 and using a virtual block storage device are similar, except for blocks 512 and 514 are replaced with blocks 512a and 514a, respectively.

In block 512a, memory is allocated on the identified node as remote memory for the remote memory client node, as before. However, the remote memory is configured to use block storage rather than conventional memory addressing.

When the server node returns its ACK message it includes block storage translation information including the virtual address of the first block. For example, the block storage translation information may include the block size and any other parameters used to effect block storage in the remote memory that is allocated.

In block 514a a memory directory entry is created including client and server node IDs, thread handle, and translation information, as before. However, in this embodiment rather than a virtual memory offset, the (block storage) translation information is used to translate between a virtual memory address used be the client node to a block storage address for the same data used by the virtual block device in the remote memory of the server node.

Remote memory access requests are likewise handled in a similar manner for both the load/store scheme shown in flowchart 700 or FIG. 7 and FIG. 8 and the virtual block device scheme. However, under the virtual block device scheme the memory directory uses the block storage translation information to translate the virtual memory address to a virtual block device address which is include in the remote memory request messages sent to the remote memory server.

Hierarchical Architecture with Multiple Programmable Networking Devices

Generally, the teaching and principles described and illustrated by the embodiments herein may be extended to a hierarchical architecture with multiple programmable networking devices. For example, rather than a cluster being limited to multiple servers/nodes connected to a single switch, a cluster may be implemented using several switches working together to provide high quality interconnect and resiliency. There are several ways this may be implemented.

In one embodiment, each switch maintains a copy of relevant information and keeps consistency among switches. For example, each switch will gather information (via its telemetry gathering module) from the nodes that are directly connected to it. The information gathered by the individual switches can be exchanged with the other switches such that memory managers in the switches have a full landscape of available remote memory sources. Since the nodes communicate with the memory manager in their local switch, each switch can make decisions for the nodes in the hierarchical cluster and carry out the memory/request accordingly. For example, the memory manager at a switch may first consider a remote memory pool provided by nodes connected to the switch. Once such a "local" remote memory pool is exhausted then the memory manager may consider remote memory at nodes connected to one or more neighboring switch.

To address reliability, a switch can periodically communicate with its neighboring switch(es) to obtain their status. In case of a switch failure, a working switch can take over the connections as well as the memory mapping directory information.

Additionally, the latency and resiliency requirement may vary from application to application. Since the memory (e.g., SRAM/registers) on programmable switches containing a memory mapping directory may be limited, memory mapping information can be selectively replicated on the nearby switches. For example, for applications that have ultra-low latency and high availability requirements, their memory mapping information might be replicated to a neighboring switch 1-hop away, whereas for the other applications, memory map may be replicated to distant switches or may not be replicated at all. In one embodiment, a control-plane entity can track the record/map of replicated directory locations.

Example Switch

Figure 9:
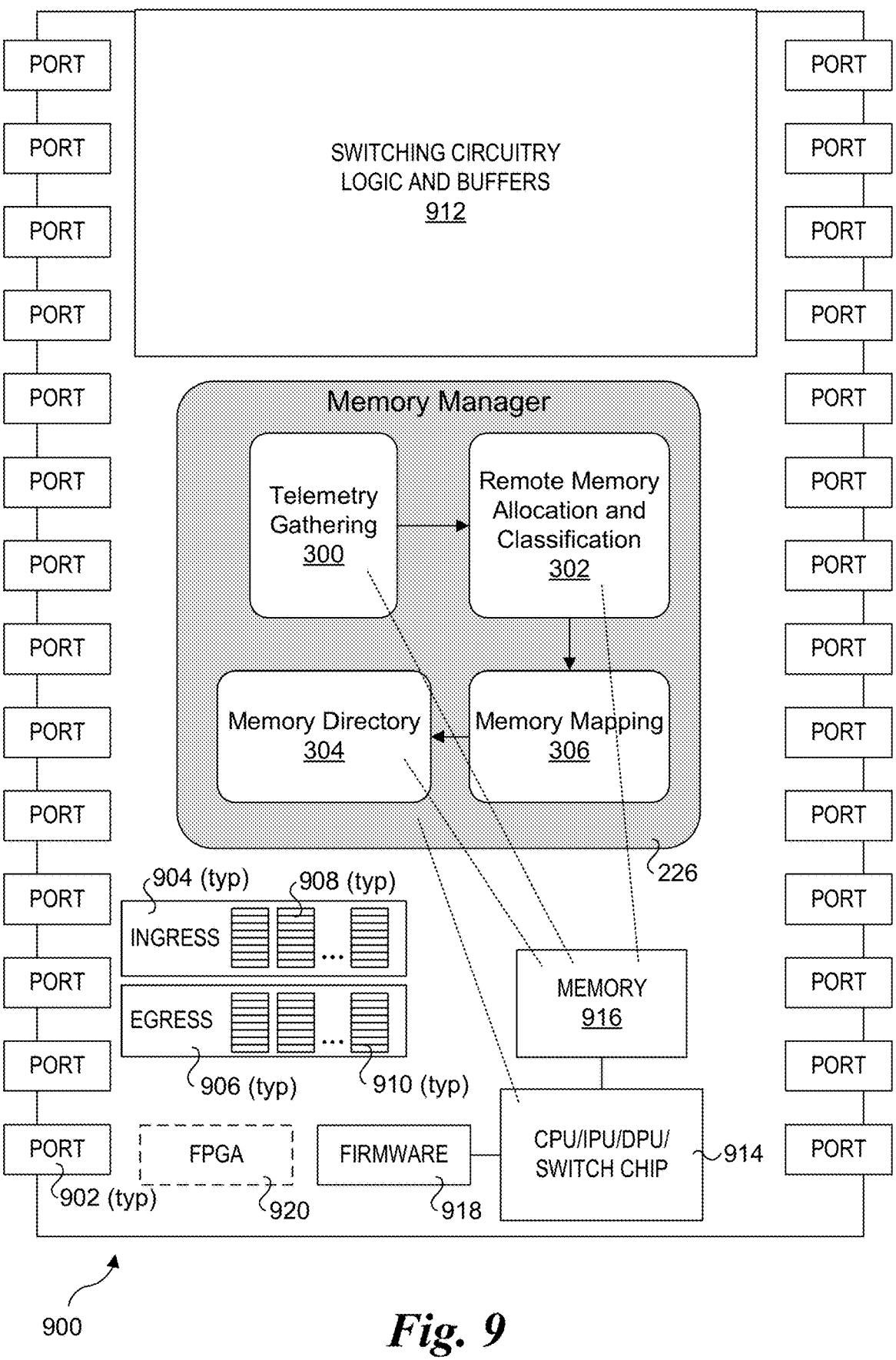
FIG. 9 is a diagram of a switch configured with circuitry and logic for implementing aspects of the programmable networking device/switch embodiments disclosed herein.

FIG. 9 shows a switch 900 on which selected components and logic shown for one or more of the programmable networking device/switch embodiments described and illustrated herein are implemented. Generally, switch 900 employs conventional switch functionality while further adding the functionality employed by the embodiments disclosed herein. Accordingly, the description and illustrating of the conventional switch aspects are abstracted as the components and structures of conventional switches are well-known in the art and outside the scope of this disclosure.

Switch 900 includes a plurality of IO ports 902 that are configured to be coupled to a network or fabric. For example, if the network is an Ethernet network, IO ports 902 are Ethernet ports and including circuitry for processing Ethernet traffic (e.g., Ethernet PHY and MAC circuitry). For a fabric, IO ports 902 may employ applicable Host Fabric Interfaces (HFIs) or other types of fabric interfaces, noting that in the art the terms "network" and "fabric" are sometimes interchanged and have similar meaning. When switch 900 is a CXL switch, IO ports 902 are configured to support CXL interfaces and implement CXL protocols. When switch 900 is a PCIe switch, IO ports 902 are configured to support PCIe interfaces and implement PCIe protocols. Generally, IO ports 902 may be configured to support networks or fabrics employing wired links (e.g., wired cable links) or optical fiber links. In the latter case, IO ports 902 may further include optical modules (not shown for simplicity).

In the illustrated embodiment, each IO port 902 includes a set of ingress buffers 904 and egress buffers 906 (only one pair of which is shown for simplicity). The ingress and egress buffers may employ multiple receive queues 908 and transit queues 910. In one embodiment, switch 900 supports QoS using different traffic classes, where some queues are allocated for different QoS levels (such as prioritized traffic associated with high bandwidth data). In some embodiments, one or more of the IO ports may have different structures and interfaces and may employ different protocols. For example, one or more ports may be used to connect to a management network or orchestrator.

The operation of switching functionality and associated ingress and egress buffer utilization is collectively shown via a switching circuitry logic and buffers block 912. This would include, among other circuitry, switchable crossbar circuitry or the like to facilitate transfer of data from queues in ingress buffers to queues in egress buffers. Switching circuitry logic and buffers block 912 may also include logic for implementing Layer 3 and above functionality, in some embodiments (such as traffic classification for QoS and other purposes, detecting invalid packets, etc.). As further shown, switch 900 includes a memory manager 226 and its associated telemetry gathering module 300, remote memory allocation and classification module 302, memory directory module 304, and memory mapping module 306.

The various logic and data structures shown and described herein may be implemented on a switch using appropriate embedded logic and circuitry. Such embedded logic may be implemented via execution of software/firmware on one or more processing elements, implementation of hardware-based logic such as preprogrammed logic (e.g., ASICs) and/or programmable logic (e.g., one or more FPGAs), or a combination of the two. In one embodiment, switch 900 includes one or more CPUs or SoCs coupled to memory. In one embodiment, switch 900 employs an IPU or DPU SoC chip that includes a plurality of processor cores in combination with FPGA circuitry. In addition, there is switch circuitry produced by various manufacturers such as switch chips that may be used for the conventional switching aspects of switch 900. In one embodiment, CPU or SoC 914 comprises a switch chip that implements to functionality ascribed to memory manager 226 in addition to conventional switch chip functionality.

In the illustrated example, switch 900 includes a CPU/IPU/DPU/Switch Chip 914 coupled to memory 916 and a firmware storage device 918. Switch 900 may also include an FPGA 920 in some embodiments. In cases where CPU/IPU/DPU/Switch Chip 914 is an IPU or DPU, the IPU or DPU may include one or more embedded FPGAs. In one embodiment, the IPU is an Intel® IPU, such as but not limited to a Mount Evans IPU chip, which includes a multi-core CPU, on-chip memory controllers, and an FPGA that may be programmed for performing various packet processing operations.

Firmware storage device 918 stores firmware instructions/modules that are executed on one or more cores in CPU/IPU 914 to effect the functionality of telemetry gathering module 300, remote memory allocation and classification module 302, memory directory module 304, and memory mapping module 306, as well as logic for handling messages (e.g., message packetizing/depacketizing and generation of the remote memory messages shown an illustrated herein). The firmware instructions are loaded into memory 916 and executed, with applicable data structures data structures being stored in memory 916. These data structures include memory directory entries, data gathered by telemetry gathering module 300, and data structure employed by remote memory allocation and classification module 302 and memory mapping module 306. Optional FPGA 920 may also be programmed to implement the functionality (in whole or in part) of one or more of telemetry gathering module 300, remote memory allocation and classification module 302, memory directory module 304, and memory mapping module 306.

Example IPU and SmartNIC Cards

Figure 10:
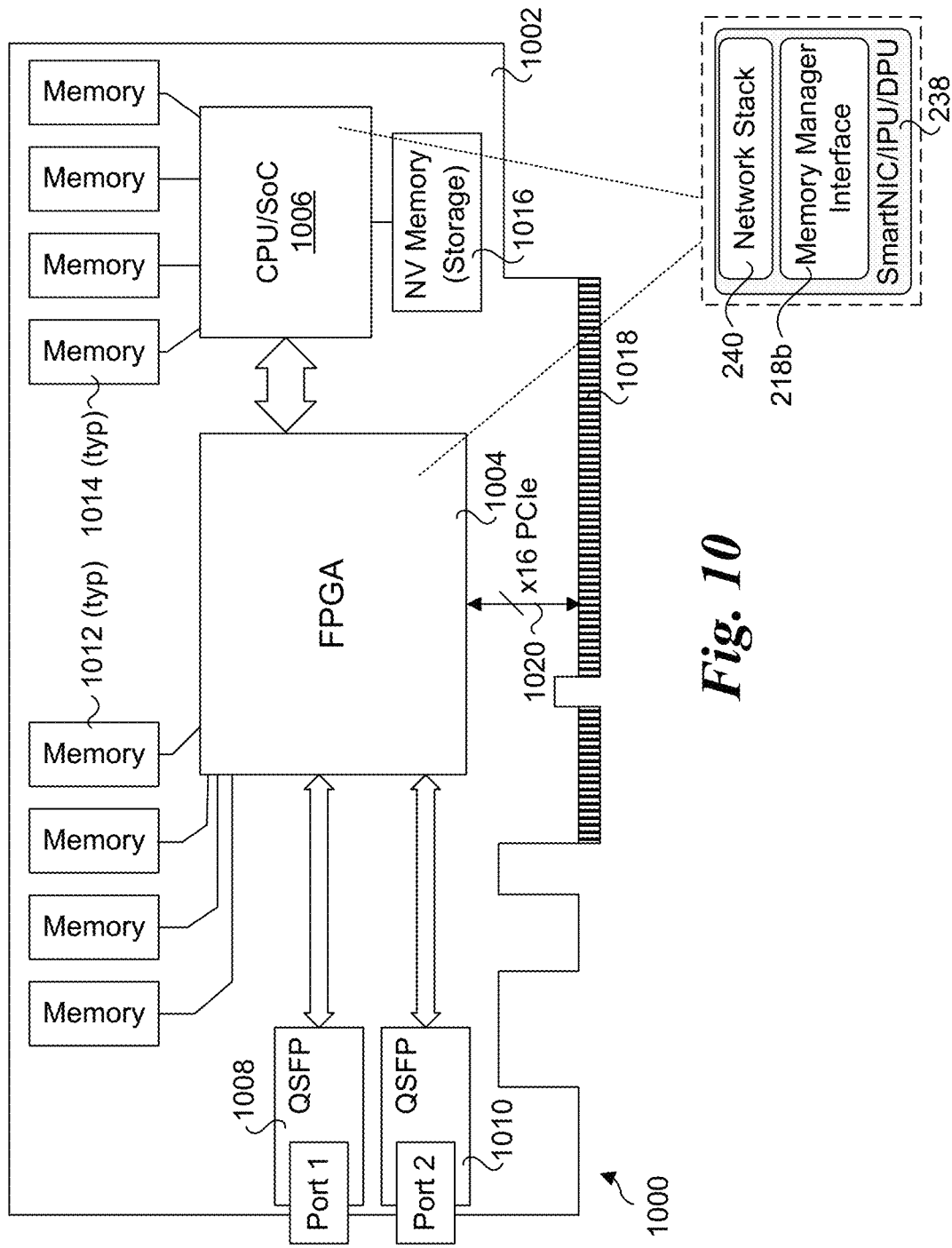
FIG. 10 is a diagram of an exemplary IPU card, according to one embodiment.

FIG. 10 shows one embodiment of IPU 1000 comprising a PCIe card including a circuit board 1002 having a PCIe edge connector to which various integrated circuit (IC) chips and modules are mounted. The IC chips and modules include an FPGA 1004, a CPU/SOC 1006, a pair of QSFP (Quad Small Form factor Pluggable) modules 1008 and 1010, memory (e.g., DDR4 or DDR5 DRAM) chips 1012 and 1014, and non-volatile memory 1016 used for local persistent storage. FPGA 1004 includes a PCIe interface (not shown) connected to a PCIe edge connector 1018 via a PCIe interconnect 1020 which in this example is 16 lanes. The various functions and logic in the embodiments of the memory manager interfaces and (optionally) network stacks (e.g., memory manager interface 218b and network stack 240) described and illustrated herein may be implemented by programmed logic in FPGA 1004 and/or execution of software on CPU/SOC 1006. FPGA 1004 may include logic that is pre-programmed (e.g., by a manufacturing) and/or logic that is programmed in the field (e.g., using FPGA bitstreams and the like). For example, logic in FPGA 1004 may be programmed by a host CPU for a platform in which IPU 1000 is installed. IPU 1000 may also include other interfaces (not shown) that may be used to program logic in FPGA 1004. In place of QSFP modules 1008, wired network modules may be provided, such as wired Ethernet modules (not shown).

CPU/SOC 1006 employs a System on a Chip including multiple processor cores. Various CPU/processor architectures may be used, including but not limited to x86, ARM®, and RISC architectures. In one non-limiting example, CPU/SOC 1006 comprises an Intel® Xeon®-D processor. Software executed on the processor cores may be loaded into memory 1014, either from a storage device (not shown), for a host, or received over a network coupled to QSFP module 1008 or QSFP module 1010.

Figure 11:
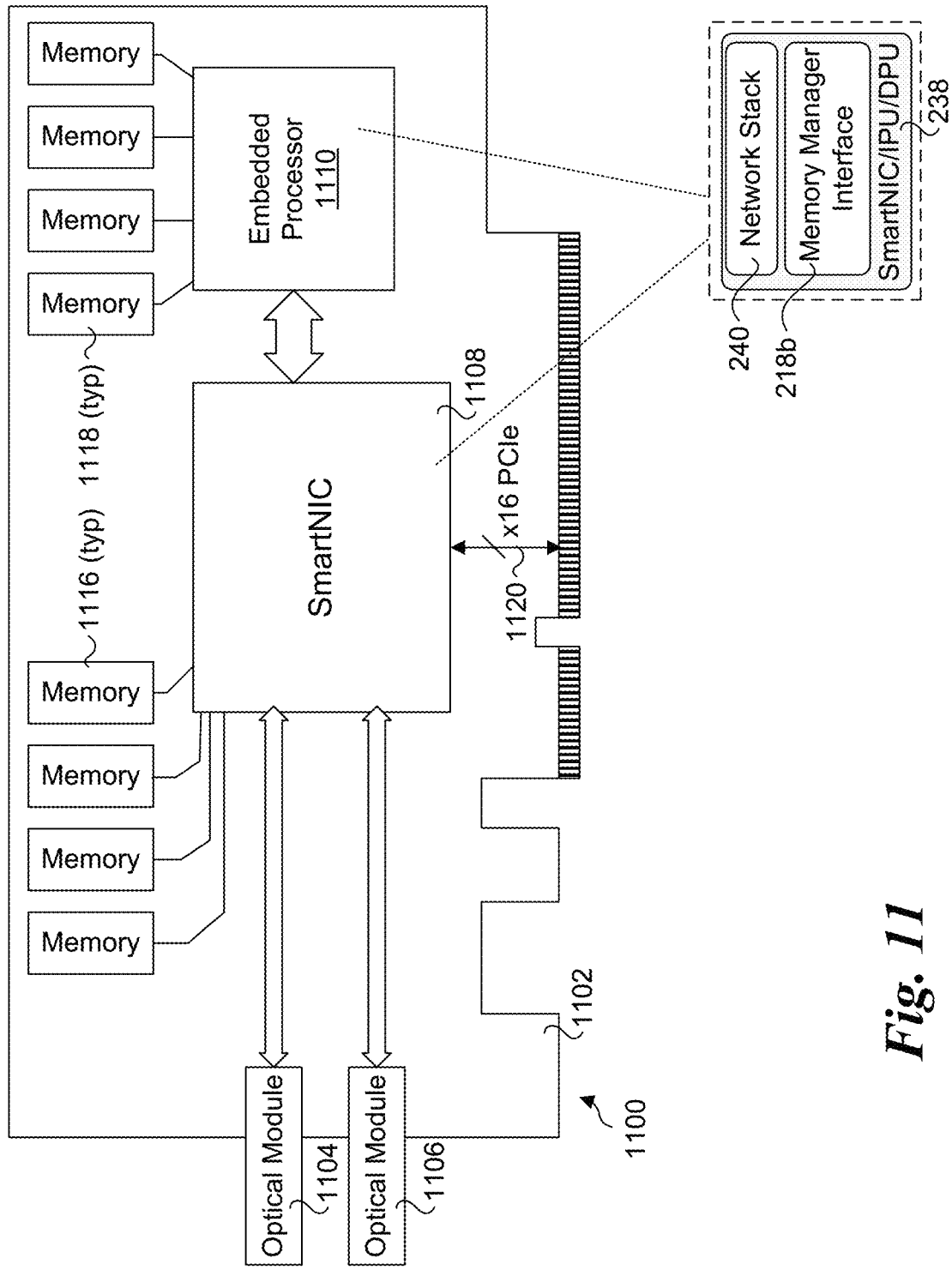
FIG. 11 is a diagram of an exemplary SmartNIC card, according to one embodiment.

FIG. 11 shows a SmartNIC 1100 comprising a PCIe card including a circuit board 1106 having a PCIe edge connector and to which various integrated circuit (IC) chips and components are mounted, including optical modules 1104 and 1106. The IC chips include an SmartNIC chip 1108, an embedded processor 1110 and memory chips 1116 and 1118. SmartNIC chip 1108 is a multi-port Ethernet MC that is configured to perform various Ethernet NIC functions, as is known in the art. In some embodiments, SmartNIC chip 1108 is an FPGA and/or includes FPGA circuitry.

Generally, SmartNIC chip 1108 may include embedded logic for performing various packet processing operations, such as but not limited to packet classification, flow control, RDMA (Remote Direct Memory Access) operations, an Access Gateway Function (AGF), Virtual Network Functions (VNFs), a User Plane Function (UPF), and other functions. In addition, various functionality may be implemented by programming SmartNIC chip 1108, via preprogrammed logic in SmartNIC chip 1108, via execution of firmware/software on embedded processor 1110, or a combination of the foregoing. The various functions and logic in the embodiments of the memory manager interfaces and (optionally) network stacks (e.g., memory manager interface 218b and network stack 240) described and illustrated herein may be implemented by programmed logic in SmartNIC chip 1108 or and/or execution of software on embedded processor 1100.

Generally, and IPU and a DPU are similar, whereas the term IPU is used by some vendors and DPU is used by others. A SmartNIC is similar to an IPU/DPU except in will generally be less powerful (in terms of CPU/SoC and size of the FPGA). As with IPU/DPU cards, the various functions and logic in the embodiments described and illustrated herein may be implemented by programmed logic in an FPGA on the SmartNIC and/or execution of software on CPU or processor on the SmartNIC. Also, as described above SmartNICs/IPUs/DPUs may implement additional functionality such as homomorphic encryption/decryption endpoints allowing switches to perform some functionality, such as memory mapping, without the need to compromise data-in-motion security. In addition to the blocks shown, an IPU or SmartNIC may have additional circuitry, such as one or more embedded ASICs that are preprogrammed to perform one or more functions related to packet processing.

Example Server Cluster Apparatus and Systems

Under embodiments herein, nodes comprising servers and/or platforms may be deployed in clusters under which the servers/platforms are interconnected in communication via one or more programmable networking devices, such as but not limited to switches. These servers and platforms may also be clustered at the chassis, drawer, sled, tray, or cabinet level.

Figures 12, 13:
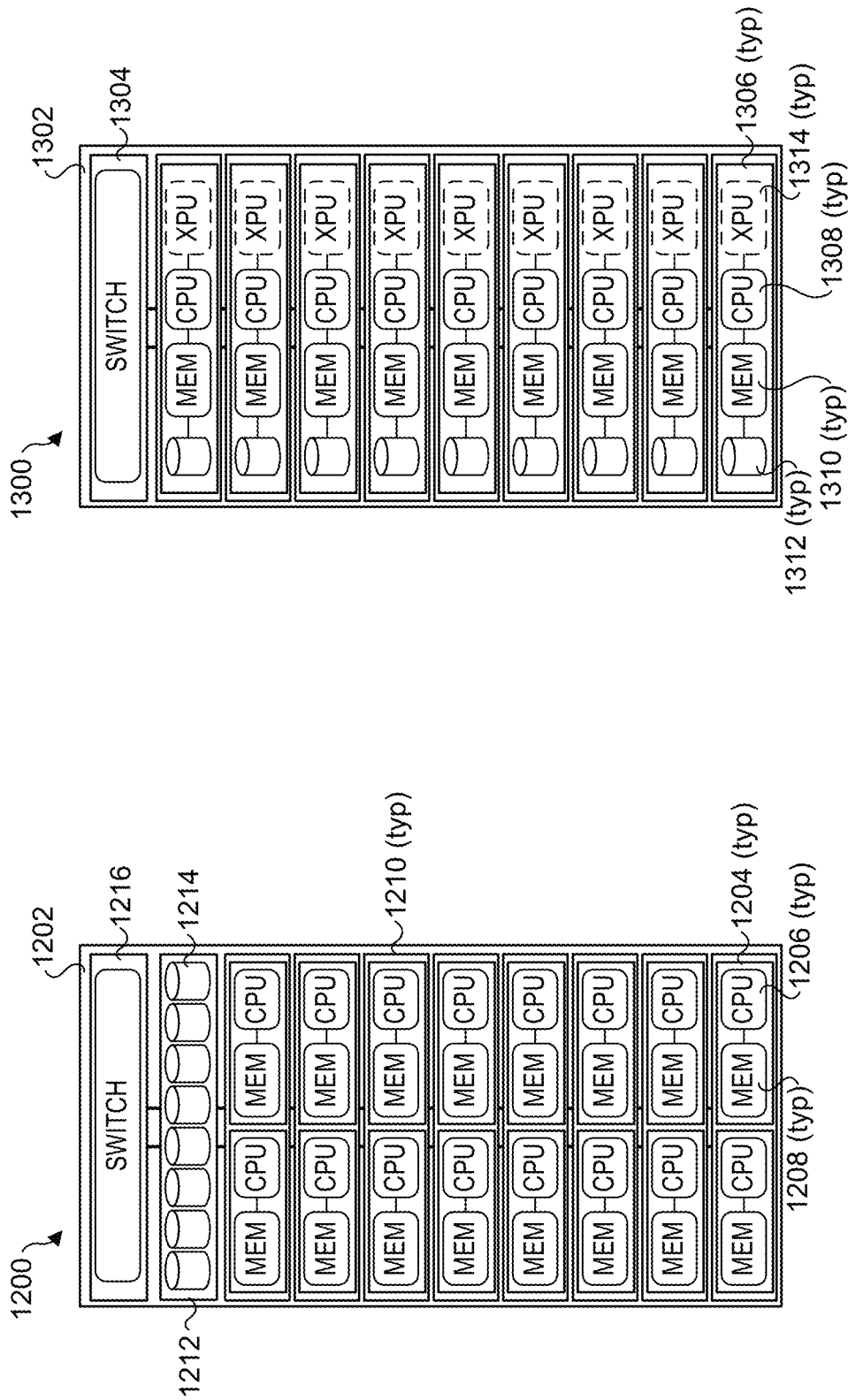
FIG. 12 is a diagram of a system in which a cluster of nodes and a programmable networking device may be deployed employing a disaggregated architecture at the rack level, according to one embodiment.
FIG. 13 is a diagram of a system in which a cluster of nodes and a programmable networking device may be deployed employing a conventional rack architecture, according to one embodiment.
Figure 14:
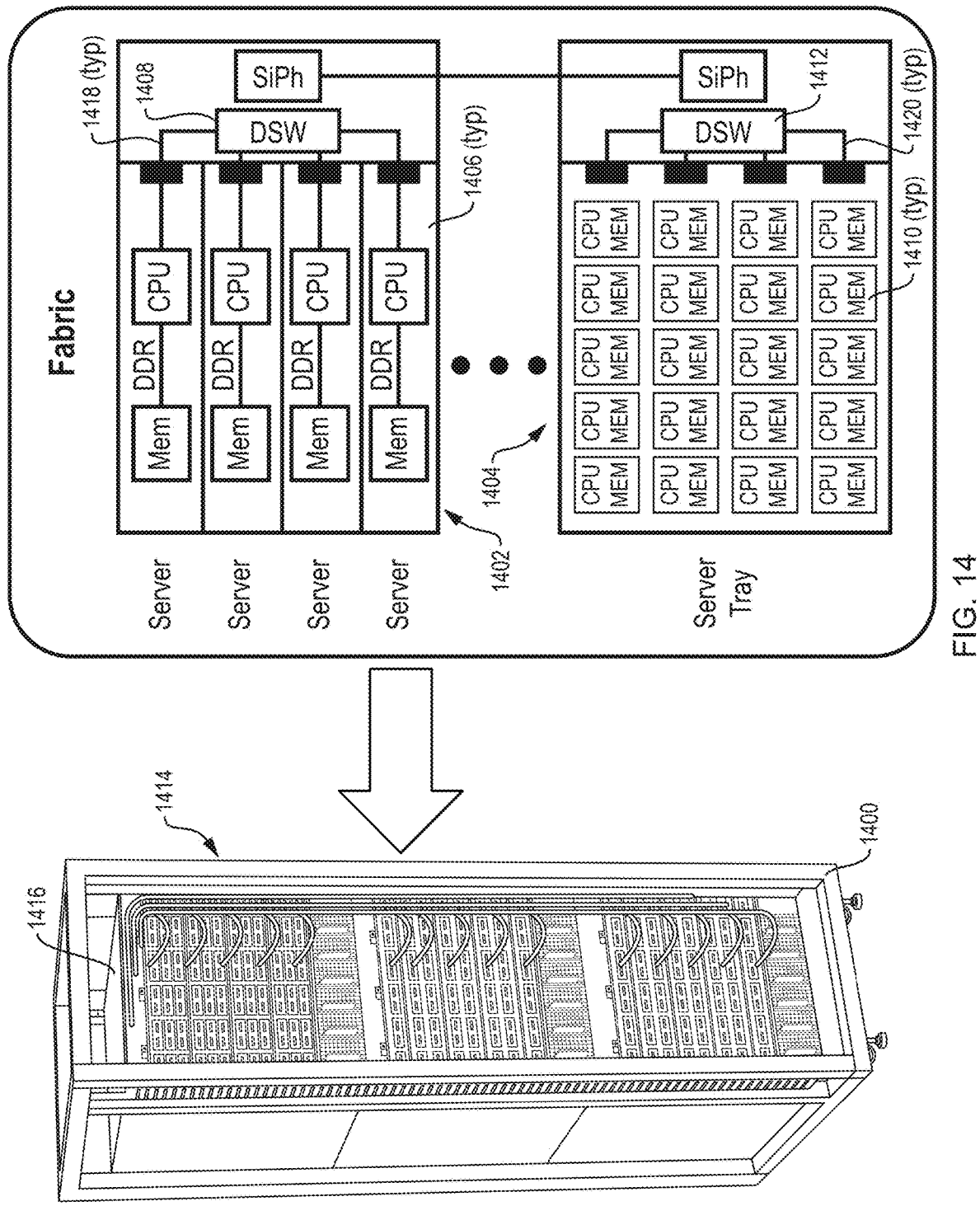
FIG. 14 is a schematic diagram illustrating a rack-level architecture employing server chassis with disaggregated edge switches coupled via SiPh links.

FIGS. 12-14 illustrate examples of apparatus and/or system environments in which aspects of the embodiments herein may be implemented. Under the rack scale disaggregation architecture 1200 of FIG. 12, the compute and storage resources are disaggregated as pooled resources in the same rack (1202). Under rack scale terminology, the rack is populated with "drawers" or "trays" with "sleds" that are installed in the rack. Generally, a drawer is like a conventional chassis used in racks such as data center racks, except drawers slide out as opposed to chassis being bolted onto the rack frame. However, in the embodiments herein, one or more of chassis, drawers, trays, and sleds may be used.

As shown in FIG. 12, the pooled compute resources include servers 1204 including a CPU 1206 coupled to memory 1208 in multiple pooled compute drawers 1210, and a pooled storage drawer 1212 including multiple storage devices 1214. The compute and storage resources are interconnected via a switch 1216 shows at the top of rack 1202 using applicable wired or optical fiber cables or the like. Generally, such switches are commonly referred to a Top of Rack (ToR) switches whether they are at the top of the rack or not. The servers 1204 may have various form factors, including but not limited to server modules, and the depiction of two servers 1204 per pooled compute drawer 1210 is for simplicity, as a given pooled compute drawer may include many more servers that shown. A disaggregated architecture may include multiple pooled storage drawers and may also include other types of pooled resources, such as pooled accelerator drawers. For clustered deployment, a single switch may be used for multiple clusters or other switches may be deployed in the rack (not shown), with servers from one or more pooled compute drawers coupled to such other switches.

FIG. 13 illustrates an example of a conventional rack architecture 1300. The architecture includes a rack 1302 in which a ToR switch 1304 and multiple servers 1306 are installed. Servers 1306 includes a CPU 1308, memory 1310, local storage 1312 and an optional XPU 1314. In some embodiments, a server 1306 may implement a two-level memory (2LM) architecture that includes volatile DRAM (Dynamic Random Access Memory) at a first level and hybrid memory combining volatile and non-volatile memory, such as a class of memory known as storage class memory (SCM). In a 2LM architecture, local storage 1312 may comprise one or more SCM devices, such as but not limited to an SCM PCIe card.

Generally, servers 1306 may occupy a 1U, 2U or 4U rack slot, or may be configured such that multiple servers are installed in a 1U, 2U or 4U rack slot. Any of chassis, drawer, sled, and tray configurations may be used. For simplicity servers 1306 are depicted to have similar components (e.g., are homogeneous servers), but this is merely illustrative and non-limiting as a server cluster may employ heterogeneous servers having different configurations.

An XPU is a term that generally applies to Other Processing Units (that are not CPUs) including one or more of Graphic Processor Units (GPUs) or General Purpose GPUs (GP-GPUs), Tensor Processing Units (TPUs), DPUs, IPUs, Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU or in addition to a CPU in the illustrated embodiments. Moreover, as used in the following claims, the term "processor" is used to generically cover CPUs and various forms of XPUs.

FIG. 14 illustrates additional examples of disaggregated architectures that may be used for server clusters. The architectures include a rack 1400 including a plurality of slots in which respective server chassis are installed, including server chassis 1402, microserver chassis 1404, and, optionally, other types of rack chassis, such as storage chassis. It is noted that rack 1400 generally may be populated with a mixture of server chassis 1402 and microserver chassis 1404, only server chassis 1402, or only server chassis 1406. Server chassis 1402 includes a plurality of servers 1406, each communicatively coupled to a disaggregated switch 1408. Microserver chassis 1404 includes one or more server trays in which multiple microservers 1410 are installed, each communicatively coupled to a disaggregated switch 1412. The disaggregated switches (DSWs) 1408 and 1412 in server chassis 1402 and microserver chassis 1404 are communicatively coupled via Silicon Photonics (SiPh) links 1414. SiPh links are also employed to connect at least a portion of the servers and/or microservers to a ToR switch 1416. SiPh links comprise Ethernet links that employ a SiPh physical layer (PHY) and SiPh cabling. Alternative, SiPh links 1414 may be replaced with Ethernet links employing copper wire PHYs or other forms of optical PHYs.

Servers 1402 are connected to DSW 1408 via links 1418. Microservers 1410 are connected to DSW 1412 via links 1420. Generally, links 1418 may comprise Ethernet links, PCIe links, or CXL links. For example, such links may be implemented in a base plane, midplane, or backplane to which servers 1402 or microservers 1410 are coupled. In some embodiments, DSW is implemented in a mezzanine card or the like that is coupled to any of a base plane, midplane or backplane either through a socketed connector, edge connector, or ribbon cable or the like.

For a server cluster deployment, DSWs 1408 may be implemented as the programmable networking devices/switches described and illustrated above, with the microservers comprising the cluster nodes. Generally, a microserver is a type of server with a relatively small form factor, but otherwise may include conventional server components including a CPU and memory.

Generally, instances of memory in the Figures herein represent a form of volatile memory or hybrid memory. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM, or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5), LPDDR5, HBM2E, HBM3, and HBM-PIM, or others or combinations of memory technologies, and technologies based on derivatives or extensions of such specifications. The JEDEC standards are available at www.jedec.org.

Hybrid memory combines volatile memory with non-volatile (NV) memory, which is a class of memory that does not lose its state when power is interrupted or removed. Example of hybrid memory include NVDIMMs and 3D CROSSPOINT™ memory devices (e.g., DIMMs) and may comprise SCM devices, as discussed above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A network apparatus, configured to be implemented in a network with a plurality of nodes comprising servers and a plurality of switches, comprising:
   a plurality of Input-Output (IO) ports;
   circuitry and logic to:
      select one or more nodes to be remote memory server nodes and allocate one or more portions of memory on those nodes to be used as remote memory for one or more remote memory client nodes;

receive a memory access request message originating from a remote memory client node containing indicia identifying memory to be accessed;

determine which remote memory server node is to be used for servicing the memory access request; and send a memory access request message containing indicia identifying memory to be accessed to the remote memory server node that is determined;

wherein:

the circuitry and logic are comprised in programmable switch circuitry comprised in at least one of the switches;

the programmable switch circuitry is to exchange telemetry information with at least one other of the switches;

the programmable switch circuitry is to determine, based upon the telemetry information, available remote memory sources to be used in allocating of the one or more portions of memory to be used as the remote memory for the one or more remote memory client nodes; and the telemetry information comprises system reliability information and/or link quality information.

2. The network apparatus of claim 1, further comprising circuitry and logic to:

receive a memory access response from the remote memory server node to which a corresponding memory access request message was sent;

determine which remote memory client node the memory access response should be returned to; and forward the memory access response to that remote memory client node.

3. The network apparatus of claim 1, further comprising circuitry and logic to maintain remote memory allocation information identifying which nodes are operated as remote memory server nodes, which nodes are operated as remote memory client nodes, and how much memory is being used as remote memory for the remote memory client and server nodes.

4. The network apparatus of claim 1, further comprising circuity and logic to maintain a memory directory including a plurality of entries, each of at least a portion of the plurality of entries associated with respective remote memory allocations and comprising:

an identifier for a remote memory client node; and an identifier for a remote memory server node.

5. The network apparatus of claim 4, wherein at least one of the plurality of entries associated with respective remote memory allocations further includes address translation information, wherein the indicia identifying memory to be accessed comprises a first virtual memory address utilized by the remote memory client node, and wherein the circuity and logic is configured to perform an address translation using the address translation information to translate the first virtual memory address to a corresponding second virtual memory address on the remote memory server node.

6. The network apparatus of claim 4, wherein at least one of the plurality of entries associated with respective remote memory allocations further includes a thread handle that is used to map a memory access request message received from a remote memory server node to a corresponding entry in the memory directory.

7. The network apparatus of claim 4, wherein at least one of the plurality of entries associated with respective remote memory allocations further includes a virtual memory range associated with a remote memory allocation utilized by a remote memory client node, further comprising circuity and logic to:

identify an entry corresponding to a memory access request message received from a remote memory client node;

compare a virtual memory address in the memory access request message to the virtual memory range to determine whether the virtual memory address falls within the virtual memory range; and reject the memory access request when the virtual memory address does not fall within the virtual memory address range.

8. The network apparatus of claim 1, wherein the plurality of IO ports comprise Ethernet ports.

9. The network apparatus of claim 1, wherein the plurality of IO ports comprise Compute Express Link (CXL) ports or Peripheral Component Interconnect Express (PCIe) ports.

10. The network apparatus of claim 1, wherein the at least one switch is configured to be installed in a rack, a switch blade configured to be installed in a blade server, or a disaggregated switch configured to be installed in a server tray or drawer.

11. A method implemented in system or environment comprising a plurality of nodes comprising servers coupled in communication via switches, each of the nodes including a central processor unit (CPU) and memory, the method comprising:

selecting one or more nodes to be remote memory server nodes and allocate one or more portions of memory on those nodes to be used as remote memory for one or more remote memory client nodes;

receiving a memory access request message originating from a remote memory client node containing indicia identifying memory to be accessed;

determining which remote memory server node is to be used for servicing the memory access request; and sending a memory access request message containing indicia identifying memory to be accessed to the remote memory server node that is determined;

wherein:

the method is to be performed, at least in part, using programmable switch circuitry comprised in at least one of the switches;

the programmable switch circuitry is to exchange telemetry information with at least one other of the switches;

the programmable switch circuitry is to determine, based upon the telemetry information, available remote memory sources to be used in allocating of the one or more portions of memory to be used as the remote memory for the one or more remote memory client nodes; and the telemetry information comprises system reliability information and/or link quality information.

12. The method of claim 11, further comprising:

gathering memory utilization information from nodes that may be implemented as a remote memory client node or remote memory server node; and receiving a remote memory allocation request from a first node;

using the memory utilization information to identify a second node to provide a portion of its memory as remote memory for the first node.

13. The method of claim 11, further comprising:
receiving a memory access response from the remote memory server node to which a corresponding memory access request message was sent;
determining which remote memory client node the memory access response should be returned to; and
forwarding the memory access response to that remote memory client node.

14. The method of claim 11, further comprising maintaining a memory directory including a plurality of entries, each of at least a portion of the plurality of entries associated with respective remote memory allocations and comprising:
an identifier for a remote memory client node;
an identifier for a remote memory server node; and
virtual memory translation information used to translate virtual memory addresses used by the remote memory client node and the remote memory server node.

15. The method of claim 11, further comprising:
receiving a memory access request message including a virtual memory address from a remote memory client node;
determining whether the virtual memory address is within a virtual memory range of remote memory allocated to the remote memory client node; and
rejecting the memory access request when the virtual memory address does not fall within the virtual memory address range.

16. A system comprising:
a plurality of nodes, each node including a central processor unit (CPU) coupled to memory;
switches having a plurality of Input-Output (IO) ports coupled to respective nodes via respective network or fabric links, at least one of the switches including circuitry and logic to;
select one or more nodes to be remote memory server nodes and allocate one or more portions of memory on those nodes to be used as remote memory for one or more remote memory client nodes;
receive a memory access request message originating from a remote memory client node containing indicia identifying memory to be accessed;
determine which remote memory server node is to be used for servicing the memory access request; and
send a memory access request message containing indicia identifying memory to be accessed to the remote memory server node that is determined;
wherein:
the circuitry and logic are comprised in programmable switch circuitry;
the programmable switch circuitry is to exchange telemetry information with at least one other of the switches;
the programmable switch circuitry is to determine, based upon the telemetry information, available remote memory sources to be used in allocating of the one or more portions of memory to be used as the remote memory for the one or more remote memory client nodes; and
the telemetry information comprises system reliability information and/or link quality information.

17. The system of claim 16, wherein a node further comprises software including an operating system, one or more applications, and a virtual memory manager that is configured to:
receive a memory access request from an application or the operating system including a virtual memory address;
determine, based at least on the virtual memory address, whether the memory access request is for accessing local memory on the node or remote memory on a remote memory server node; and
when it is determined that memory access requests is for accessing remote memory on a remote memory server node sending a remote memory access message with the virtual memory address to the switch.

18. The system of claim 17, wherein the switch further comprises circuitry and logic to maintain a memory directory including a plurality of entries associated with respective remote memory allocations, at least a portion of the plurality of entries including virtual address translation information, and wherein the switch is configured to:
receive the remote memory access message;
identify a remote memory server node to be used to service the memory access request;
use the virtual address translation information to translate the virtual memory address; and
send a remote memory access request including the translated virtual memory address to the remote memory server node that is identified.

19. The system of claim 17, wherein the switch includes a memory manager and wherein a node further comprises a memory manager interface that is configured to communicate with the memory manager via remote memory access request and remote memory access response messages.

20. The system of claim 16, wherein the plurality of nodes comprise servers installed in sled, tray, or chassis, and network or fabric comprises a plurality of Compute Express Link (CXL) links or Peripheral Component Interconnect Express (PCIe) links.

21. An integrated circuit, configured to be installed in a networking device including a plurality of Input-Output (IO) ports, the networking device configured to be implemented in a system including a plurality of nodes comprising servers coupled via switches and respective links to the IO ports, the integrated circuit comprising circuitry and logic to:
select one or more nodes to be remote memory server nodes and allocate one or more portions of memory on those nodes to be used as remote memory for one or more remote memory client nodes;
receive a memory access request message originating from a remote memory client node containing indicia identifying memory to be accessed;
determine which remote memory server node is to be used for servicing the memory access request; and
send a memory access request message containing indicia identifying memory to be accessed to the remote memory server node that is determined;
wherein:
the circuitry and logic are comprised in programmable switch circuitry comprised in at least one of the switches;
the programmable switch circuitry is to exchange telemetry information with at least one other of the switches;
the programmable switch circuitry is to determine, based upon the telemetry information, available remote memory sources to be used in allocating of the one or more portions of memory to be used as the remote memory for the one or more remote memory client nodes; and
the telemetry information comprises system reliability information and/or link quality information.

22. The integrated circuit of claim 21, further comprising circuitry and logic to:

receive a memory access response from the remote memory server node to which a corresponding memory access request message was sent;

determine which remote memory client node the memory access response should be returned to; and forward the memory access response to that remote memory client node.

23. The integrated circuit of claim 22, further comprising circuity and logic to maintain remote memory allocation information identifying which nodes are operated as remote memory server nodes, which nodes are operated remote memory client nodes, and how much memory is being used as remote memory for the remote memory client and server nodes.

24. The integrated circuit of claim 22, further comprising circuity and logic to maintain a memory directory including a plurality of entries, each of at least a portion of the plurality of entries associated with respective remote memory allocations and comprising:

an identifier for a remote memory client node; and an identifier for a remote memory server node.

25. The integrated circuit of claim 22, wherein at least one of the plurality of entries associated with respective remote memory allocations further includes address translation information, wherein the indicia identifying memory to be accessed comprises a first virtual memory address utilized by the remote memory client node, and wherein the circuity and logic is configured to perform an address translation using the address translation information to translate the first virtual memory address to a corresponding second virtual memory address on the remote memory server node.

* * * * *